(12) United States Patent
Bui et al.

(10) Patent No.: US 12,532,890 B2
(45) Date of Patent: Jan. 27, 2026

(54) MICROBIAL COMPOSITION AND MICROORGANISM-BASED METHOD OF MANUFACTURING AND TREATING OF ANIMAL FARMS USING OF THE SAME

(71) Applicants: Quan Hong Bui, Ho Chi Minh (VN); Trang Huyen Luu, Ho Chi Minh (VN)

(72) Inventors: Quan Hong Bui, Ho Chi Minh (VN); Trang Huyen Luu, Ho Chi Minh (VN)

( * ) Notice: Subject to any disclaimer, the term of this patent is extended or adjusted under 35 U.S.C. 154(b) by 27 days.

(21) Appl. No.: 17/387,048

(22) Filed: Jul. 28, 2021

(65) Prior Publication Data

US 2023/0046446 A1 Feb. 16, 2023

(51) Int. Cl.
| | |
|---|---|
| *A01N 63/20* | (2020.01) |
| *A61L 9/00* | (2006.01) |
| *C12N 1/20* | (2006.01) |
| *C12R 1/125* | (2006.01) |
| *C12R 1/23* | (2006.01) |
| *C12R 1/245* | (2006.01) |
| *C12R 1/25* | (2006.01) |
| *C12R 1/465* | (2006.01) |

(52) U.S. Cl.
CPC ............... *A01N 63/20* (2020.01); *A61L 9/00* (2013.01); *C12N 1/20* (2013.01); *C12R 2001/125* (2021.05); *C12R 2001/23* (2021.05); *C12R 2001/245* (2021.05); *C12R 2001/25* (2021.05); *C12R 2001/465* (2021.05)

(58) Field of Classification Search
CPC . C12N 1/20; C12R 2001/125; C12R 2001/23; C12R 2001/245; C12R 2001/25; C12R 2001/465; A01N 63/20; A01N 63/22; A01N 63/23; A01N 63/25; A01N 63/32
See application file for complete search history.

(56) References Cited

U.S. PATENT DOCUMENTS

| | | | | |
|---|---|---|---|---|
| 5,682,709 A | * | 11/1997 | Erickson | .................. A01G 7/02 47/1.4 |
| 2012/0034342 A1 | * | 2/2012 | Courbois | ............. C12N 9/2425 435/201 |
| 2020/0224151 A1 | * | 7/2020 | Drouillard | ............. A23K 50/75 |

FOREIGN PATENT DOCUMENTS

| | | | | |
|---|---|---|---|---|
| CN | 101269227 B | * | 7/2011 | |
| CN | 102362637 A | * | 2/2012 | |
| EP | 3095855 A1 | * | 11/2016 | ................ C02F 3/34 |
| RU | 2444366 C1 | * | 3/2012 | |

OTHER PUBLICATIONS

Stewart, BA, "Dryland Farming: Concept, Origin and Brief History." In: Farooq, et al. (eds.), Innovations in Dryland Agriculture. 2016. Springer, pp. 3-29. (Year: 2016).*
Leong, SS et al. Biorisk assessment of antibiotic-resistant pathogenic bacteria isolated from swiftlet houses in Sarawak. Pertanika J . Trop. Agric. Sc. 2019. 42(1): 285-303. (Year: 2019).*
Kumar, D et al. Molecular tools to study preharvest food safety challenges. Microbiology Spectrum. 2018. 6(1): PFS-0019-2017. 16 pages. (Year: 2018).*
Piamsomboon, P et al. Identification of bacterial pathogens in cultured fish with a custom peptide database constructed by matrix-assisted laser desorption/ionization time-of-flight mass spectrometry (MALDI-TOF MS). BMC Veterinary Research. 2020. 16(1): 52. 10 pages. Published online Feb. 11, 2020. (Year: 2020).*
Hassanzadeh, AH et al. Immobilization and microencapsulation of Lactobacillus caseii and Lactobacillus plantarum using zeolite base and evaluating their viability in gastroesophageal-intestine simulated condition. Ars Pharm. 2017. 58(4): 163-170. (Year: 2017).*
Duan, M et al. Effects of Bacillus subtilis on carbon components and microbial functional metabolism during cow manure-straw composting. Bioresource Technology. 2020. 303: 122868. 8 pages. Available online Jan. 28, 2020. (Year: 2020).*
Quek, MC et al. Preliminary nitrite, nitrate and colour analysis of Malaysian edible bird's nest. Information Processing in Agriculture. 2015. 2: 1-5. (Year: 2015).*
Mamduh, SM et al. Odour and hazardous gas monitoring system for swiftlet farming using wireless sensor network (WSN). Chemical Engineering Transactions. 2012. 30: 331-336. (Year: 2012).*

* cited by examiner

*Primary Examiner* — David W Berke-Schlessel
*Assistant Examiner* — Susan E. Fernandez

(57) ABSTRACT

A microbial composition for improving the conditions in animal farms comprising: a slow-releasing carrier base having a first predetermined percentage by weight (w/w %); and a mixture of microorganisms identified in a 16S rRNA gene sequence so that the composition is capable of denitrification, feces decomposition, and hydrogen sulfide ($H_2S$) oxidation.

10 Claims, 4 Drawing Sheets

MICROBIAL COMPOSITION AND MICROORGANISM-BASED METHOD OF MANUFACTURING AND TREATING OF ANIMAL FARMS USING OF THE SAME

FIELD OF THE INVENTION

The present invention relates generally to the field of animal farming. More specifically, the present invention relates to microorganism-based method and composition in animal farming.

BACKGROUND ART

The demands for edible bird nests (EBN) are growing throughout Asia, especially in China, Indonesia, Malaysia, Thailand, Vietnam, Cambodia, and Laos. Additionally, the boom of online EBN sellers has contributed to the increase in sales of bird's nest products. In 2019 and 2020, the official import of bird's nests into China was 200 metric tons and expected to increase to 300 metric tons in 2021. A kilogram of bird's nest can cost $3,000 to $4,000 USD, making the bird's nests one of world's most expensive food products. The total revenue of bird's nests reaches 5 billion USD. Clearly, birds' nests of swiftlets (*Aerodramus fuciphagus*, *Aerodramus maximus*, and *Aerodramus spodiopygius*) in their natural habitats are not sufficient to meet the demands. As a result, birds' nest farming started to flourish to preserve the species and to meet the market demands.

The main component of edible bird nests (EBN) is a glutinous solution excreted from a pair of sub-lingual salivary glands of the swiftlets. The saliva solidifies into a kind of cement in shape of a cup, strong enough to hold eggs and growing hatchlings. Medicinal benefits and nutritional contents of EBN have been reported. EBN is mainly composed of 60-65% protein, 8-31% carbohydrate, 2.1% ash, and 0.14-1.28% lipid. EBN also contains minerals including calcium (Ca), sodium (Na), magnesium (Mg), and potassium (K). EBN exhibits anti-influenza virus activities, epidermal growth effects, neuro-protective effects, and antioxidant properties. EBN is also effective in lysing mucus, improving the voice, relieving gastric problems, aiding renal functions, boosting libido, lightening skin tone, alleviating asthma, suppressing cough, curing tuberculosis, strengthening the immune system, speeding recovery from illness and surgery, increasing energy and metabolism, and improving concentration.

A manmade bird house is usually a rectangular structure with many narrow exit/entrance slits designed to resemble the swiftlet caves. These bird houses are made of either cement, wood, rocks, or bricks. To have a successful swiftlet bird house operation, sound, temperature, wind, humidity, smell, and lighting are vital. Bird sound recorded from the swiftlets' natural habitat is blasted through loudspeakers to attract swarms of swiftlets of thousands strong. Currently, swiftlet hormone such as Black portion Swiftlet Hormone 4.5L has been sprayed the interior of the bird house to lure swiftlets to nest and to stay. Another Hormones and Aroma—such as Love Potion Bird Nest, Piro Booster, G1L4, and Super Hormone—have been used to eliminate fleas, fungi, cockroaches, lizards, ants; improving the quality of the swiftlet nests.

However, the current formulas cannot eliminate all widespread hygienic problems in manmade bird houses: Nitrates and nitrites, lead, cadmium, arsenic, and ticks from guano that may cause diseases such as avian malaria. Furthermore, in dark bird houses, hydrogen sulfide ($H_2S$) are accumulated overtime. At low concentration, hydrogen sulfide aka sewer gas, swamp gas, stink damp, and sour damp is a colorless gas known for its pungent "rotten odor". This gas is extremely flammable and highly toxic. There are other public concern such as the high level of nitrite ($NO_2^-$) and nitrates ($NO_3^-$) due to their accumulation from the fermentation process of bird soil and guano and the atmosphere, water, and soil.

So far there have been no solutions and/or techniques to improve the farming conditions of these manmade bird houses. The improvement particularly concentrates in improving the living conditions of the bird houses so as to attract the swiftlets to make their nests therein, eliminating hydrogen sulfide ($H_2S$) gas, eliminating nitrates and nitrites, and decomposing swiftlets' feces (guano) to prevent the health risks to both human who live near the birdhouses and the swiftlets themselves. In brief, what the market needs is how to improve the total living conditions for the swiftlets.

In addition, the same problems described above are also encountered in poultry farms, aquatic farms (aquafarms), and other cattle farms such as cows, pigs, goats, and sheep.

Therefore what are needed are materials and farming method that provide ideal living conditions—light, smell, odor, humidity, and hygiene—for swiftlets bird houses and other farming animals such as poultry, cows, sheep, horses, pigs, fishes, shrimps, and eels. More specifically, there are needs for compositions and methods for sustainable farming of swiftlet bird houses that can effectively eliminate nitrites, hydrogen sulfide ($H_2S$), decompose swiftlets guano, reduce the rotten odor of the guano, and facilitate the swiftlets to pair up and nest in the bird houses.

The present invention provide solutions for the above problems.

SUMMARY OF THE INVENTION

Accordingly, an object of the present invention is to provide a microorganism composition for improving the conditions in animal farms which includes having a first weight predetermined percentage weight (by percentage—w/w %) and a mixture of bacteria with their 16S rRNA sequencing method identified, so that the composition is capable of denitrification and hydrogen sulfide ($H_2S$) oxidation.

Another object of the present invention is to provide a micro-organism based method for improving the living conditions in all types of animal farms which includes: (a) determining whether a target animal farm is an aquafarm; (b) if the target animal farm is not an aquafarm and is a swiftlet bird house, identifying all pathogenic agents from bio samples of the swiftlet bird houses; (c) identifying all beneficial microorganisms including antagonistic microorganism which eliminate the pathogenic agents of the swiftlet bird house using a 16S rRNA sequencing method; (d) synthesizing the antagonistic microorganisms for the swiftlet bird house; (e) encapsulating the antagonistic microorganisms for the swiftlet bird houses with a slow-releasing carrier to obtain a microorganism composition for such swiftlet bird house; and (f) applying the microorganism to the swiftlet bird house.

Another object of the present invention is to improve the living conditions in animal farm houses, especially swiftlet bird houses.

Another object of the present invention is to obtain a microorganism composition capable of decomposing swiftlet droppings (guano) in the swiftlet bird houses to prevent toxic gases and other polluting agents from accumulating.

Another object of the present invention is to obtain a microorganism composition capable of helping edible bird's nests to attain healthy white color;

Another object of the present invention is to provide a microorganism composition capable of helping swiftlets to stay healthy, increasing the number of bird nests whose fibers are sturdy, flexible, long-stranded, and unbroken.

Another object of the present invention is to provide a microorganism composition capable of preventing insects such as aunts, mites, and bugs from harming the swiftlets' newly born chicks;

Another object of the present invention is to provide a microorganism composition capable of preventing fungi from growing on the nest supporting wooden bars located on the surrounding walls, and on the floors.

Another object of the present invention is to provide a microorganism composition capable of preventing parasites from growing from the accumulated swiftlet's droppings (guano) that can adversely affect the swiftlets and their nests.

Another object of the present invention is to provide a microorganism composition capable of attracting the swiftlets to come dwelling inside the bird houses;

Another object of the present invention is to provide a microorganism composition capable of keeping the swiftlets from leaving the bird houses;

Another object of the present invention is to provide a microorganism composition capable of causing the swiftlets to pair up and to nest in the bird houses;

Another object of the present invention is to provide a microorganism composition capable of making the newly born swiftlet chicks to feel comfortable in their nests;

Another object of the present invention is to provide a microorganism composition capable of causing the swiftlet chicks to stay and to nest in their bird houses where they were born;

Another object of the present invention is to provide a microorganism composition capable of increasing the number of bird's nests per bird house;

Another object of the present invention is to provide a microorganism composition capable of shortening the edible bird's nests (EBN) harvesting cycle;

Another object of the present invention is to provide a microorganism composition capable of lengthening the durability and the longevity of the bird houses;

Another object of the present invention is to provide a microorganism composition capable of stimulating the reproduction of the swiftlets;

Another object of the present invention is to provide a microorganism composition capable of eliminating the new cement odors of newly built bird houses;

Another object of the present invention is to provide a microorganism composition capable of eliminating the smells of new woods inside the bird houses that dispel the swiftlets;

Another object of the present invention is to provide a microorganism composition capable of eliminating the rotten smells of the molds and fungi in the old swiftlet houses, improving the living conditions of the existing and old swiftlet houses;

Another object of the present invention is to provide a microorganism composition capable of quickly stabilizing the air quality inside newly built bird houses;

Another object of the present invention is to provide a microorganism composition capable of reducing stresses to swiftlets;

Another object of the present invention is to provide a microorganism composition capable of recreating a healthy and conducive environment to the swiftlets;

Another object of the present invention is to provide a microorganism composition capable of eliminating hydrogen sulfide ($H_2S$) and nitrite ($NO_2^-$), ammonia ($NH_3$), and nitrate ($NO_3^-$) accumulated over time inside the bird houses;

Another object of the present invention is to provide a microorganism composition (solution/formula) capable of decomposing animal manure after being collected from animal farms such as barns, bird houses, fowl houses to minimize pollution to the surrounding environment and the final product can be used as a safe fertilizer for trees, plants, and the green environment;

Yet another object of the present invention is to provide a microorganism composition capable of increasing the nutritional values and proteins of the edible bird's nests (EBN); and Yet another object of the present invention is to provide a microorganism composition in form of gel, solid, power, liquid that achieves the above objectives of the present invention.

These and other advantages of the present invention will no doubt become obvious to those of ordinary skill in the art after having read the following detailed description of the preferred embodiments, which are illustrated in the various drawing Figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
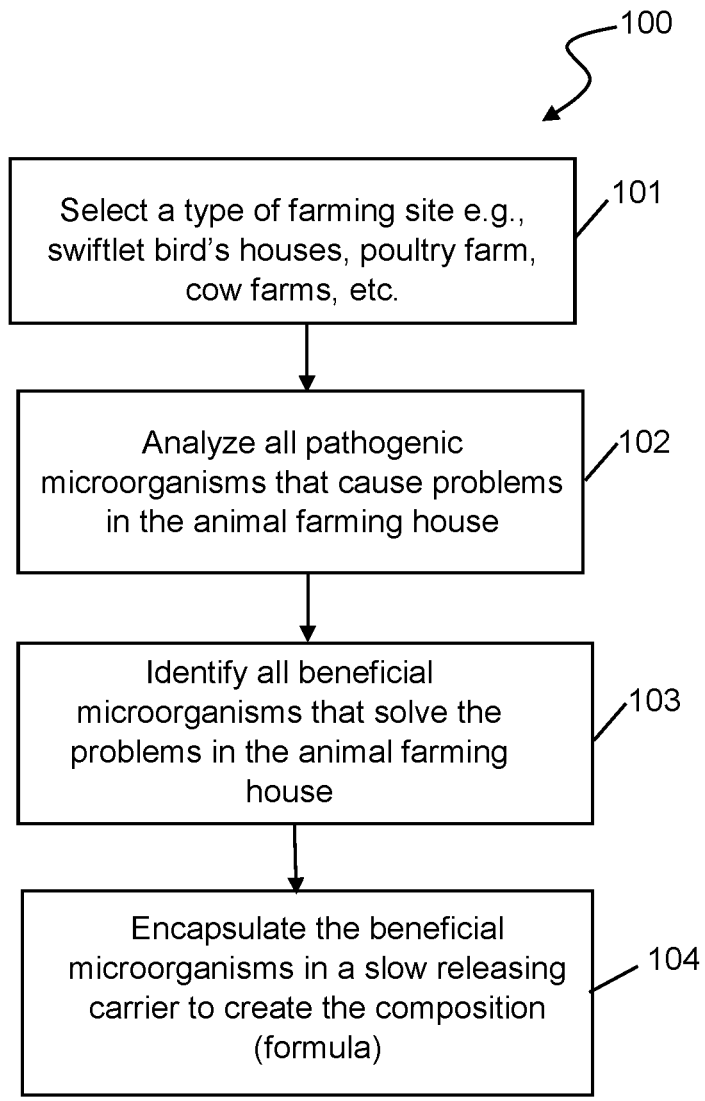
FIG. 1 is a flowchart illustrating method for finding microbial solutions that improve the living conditions of animal farms such as swiftlet bird houses, cattle farms, fowl farms, aquatic farms in accordance with an embodiment of the present invention.

One embodiment of the invention is now described with reference to FIG. 1. FIG. 1 illustrates a process 100 for finding a microorganism-based solution to improve the living conditions of animal farms in accordance with an exemplary embodiment of the present invention. At step 101, a type of animal farm is selected for treatment. Within the scope of the present invention, step 101 is applicable to animal farms including but not limited to swiftlet bird houses, poultry farms, all sorts of cattle farms, aquafarms, or any farm animals raised for agricultural, industrial, and/or commercial purposes. In practice, such animal farms are ubiquitous around the world. For example, swiftlet bird houses are found around Southeast Asia countries such as Malaysia, Indonesia, Vietnam, Thailand and Cambodia. In Vietnam, swiftlets have been raised in 42 out of 63 provinces and cities with a total of about 10,000 swiftlet bird houses, of which Kien Giang province has the most number which amounts to 2,600. On the other hand, poultry farms are also found everywhere in Vietnam and Southeast Asia. The Binh Phuoc province has the largest poultry complex which can process up to 100 million chickens per year. While Tyson foods in the U.S. claim to process billion of chickens per year. Therefore, selection of appropriate animal farms is a necessary step since they have different pathogenesis and issues.

Next at step 102, identifying all pathogenic agents that cause health problems in the selected animal farms. In practice, step 102 is realized by taking samples from existing animal farms to analyze for pathogenic agents. Factors analyzed in step 102 include but not limited to sound, temperature, wind, humidity, smell, lighting, feces, and nest materials. In some aspects of the present invention, step 102 is also performed by sensors such as Internet of Things (IoT). For example, excess amounts of hydrogen sulfide ($H_2S$), ammonia ($NH_3$), Carbon monoxide (CO), or Carbon dioxide ($CO_2$), etc. can be sensed and identified by a wide variety of sensing technologies for gas detection including electrochemical gas sensors, semiconductor gas sensors, moisture absorbing material sensors, and infrared sensors.

At step 103, after the problems have been thoroughly understood, identifying and synthesizing all beneficial organisms including antagonistic microorganism and agents that can solve the problems in step 102 and ameliorate the total living conditions of animal farms. In many aspects of the present invention, the two main problems that adversely affect the swiftlet bird houses are hydrogen sulfide ($H_2S$) and ammonia ($NH_3$). These two problems are found in more 95% of the swiftlet bird houses. This is because of the bird drops or guano and the lack of sunlight thereof similar to that of dark caves or the sewages. The synthesizing process of step 102 is described in more details in the Experiment section.

TABLE 1

Some Examples of Beneficial Microorganisms That Improve the Living Conditions of the Swiftlet Bird Houses

| No. | Microorganism | Description |
|---|---|---|
| 1 | *Paenibacillus favisporus* | Isolated from catfish pond sediment. Identified by the 16S rRNA sequence. Used in nitrogen cycle to clean up ammonia ($NH_3$). |
| 2 | *Bacillus stratosphericus* | Isolated from catfish pond sediment. Identified by the 16S rRNA sequence. Used to hydrolysis starch, biodegradable cellulose. |
| 3 | *Paenibacilus typhea* | Isolated from catfish pond sediment. Identified by the 16S rRNA sequence. |
| 4 | *Bacillus aryabhattai:* | Isolated from catfish pond sediment. Identified by the 16S rRNA sequence.Used to hydrolysis starch, biodegradable cellulose. |
| 5 | *Fictibacillus phosphorivorans* | Isolated from catfish pond sediment, Identified by the 16S rRNA sequence. Used for phosho soluble. |
| 6 | *Bacillus xiamenensis* | Isolated from catfish pond sediment. Used to hydrolysis protein. Used to generate healthy environment for swiftlets. |
| 7 | *Bacillus megaterium* | Isolatede from shrimp pond sediment. Identified by the 16S rRNA sequence. Used for phosho soluble. |
| 8 | *Bacillus altitudinis* | Isolated from agriculture soil. Identified by the 16S rRNA sequence. Used to clean up excess metal ions. Used to hydrolysis starch. |
| 9 | *Bacillus velezensis* | Isolated from catfish pond sediment. Identified by the 16S rRNA sequence. Used to hydrolysis starch, protein; promoting healthy biosphere for swiftlets, facilitating pairing up and nesting |
| 10 | *Bacillus amyloliquefaciens* | Isolated from rhizosphere soil of legum. Identified by the 16S rRNA sequence. Used to hydrolysis starch, biosynthesis bioflocuulant. |
| 11 | *Baccillus subtilis* | Isolated from many sources. Biosynthesis enzyme amylase, protease, lipase. Protease, bacteriocine |
| 12 | *Baccillus licheniformis* | Isolated from sediment shrimp ponds. Biosyntheis protease, lipase to degradation organic material promoting healthy biosphere for swiftlets, facilitating pairing up and nesting |
| 13 | *Bacillus mensentericus* | Isolated from sediment shrimp ponds. Biosyntheis amylase breakdown starch lipase to degradation organic material promoting healthy biosphere for swiftlets, facilitating pairing up and nesting |
| 14 | *Bacillus pumilus* | Isolated from sediment shrimp ponds. Biosynthesis enzyme amylase, biofluculant. Rapid degradation of organic material. |
| 15 | *Bacillus coagulans* | Isolated from food lactic fermentation. Lactic fermentation and biosynthesis bacteriocine |
| 16 | *Bacillus thuringiensis* | Isolated from soil. Biosynthesis endotoxin to kill pests. |
| 17 | *Bacillus firmus* | Isolated from soil. Biosynthesis protease |
| 18 | *Bacillus aryabhattai* | Isolated from soil. Biosynthesis enzyme cellulase, tao biofluculant |
| 19 | *Lactobacillus acidophillus* | Isolated from food fermentation. Identification by Biochemical tests. Biosynthesis bacteriocine and lactic fermentation for acid lactic against pathogen bacteria and mold. |
| 20 | *Lactobacillus plantarum* | Isolated from pickle. Identification by Biochemical tests. Biosynthesis bacteriocine and lactic fermentation for acid lactic against pathogen bacteria and mold |
| 21 | *Lactobacillus caseii* | Isolated from natural fermentation milk. Identification by Biochemical tests. Biosynthesis bacteriocine and Biosynthesis bacteriocine and lactic fermentation for acid lactic against pathogen bacteria and mold |
| 22 | *Lactobacillus fermentum* | Isolated from food fermentation lactic. Identification by Biochemical tests. Biosynthesis bacteriocine and lactic fermentation for acid lactic against pathogen bacteria and mold |
| 23 | *Streptococcus thermophilus* | Isolated from food fermentation lactic. Identification by Biochemical tests. Biosynthesis bacteriocine and lactic fermentation for acid lactic against pathogen bacteria and mold |
| 24 | *Pediococcus acidilactici* | Isolated from food fermentation lactic. Identification by Biochemical tests. Biosynthesis bacteriocine and lactic fermentation for acid lactic against pathogen bacteria and mold |

TABLE 1-continued

Some Examples of Beneficial Microorganisms That Improve the Living Conditions of the Swiftlet Bird Houses

| No. | Microorganism | Description |
|---|---|---|
| 25 | Lactococcus lactis | Isolated from food fermentation lactic. Identification by Biochemical tests. Biosynthesis bacteriocine and lactic fermentation for acid lactic against pathogen bacteria and mold |
| 26 | Lactobacillus rhamnosus | Isolated from food fermentation lactic. Identification by Biochemical tests. Biosynthesis bacteriocine and lactic fermentation for acid lactic against pathogen bacteria and mold |
| 27 | Lactobacillus reuteri | Isolated from food fermentation lactic. Identification by Biochemical tests. Biosynthesis bacteriocine and lactic fermentation for acid lactic against pathogen bacteria and mold |
| 28 | Lactobacillus paracasei | Isolated from food fermentation lactic. Identification by Biochemical tests. Biosynthesis bacteriocine and lactic fermentation for acid lactic against pathogen bacteria and mold |
| 29 | Lactobacillus helviticus | Isolated from food fermentation lactic. Identification by Biochemical tests. Biosynthesis bacteriocine and lactic fermentation for acid lactic against pathogen bacteria and mold |
| 30 | Lactobacillus grasseri | Isolated from food fermentation lactic. Identification by Biochemical tests. Biosynthesis bacteriocine and lactic fermentation for acid lactic against pathogen bacteria and mold |
| 31 | Enterococcus faecium | Isolated from sediment shrimp ponds. Identification by Biochemical tests. Lactic fermentation for acid lactic against pathogen bacteria and mold |
| 32 | Enterococcus faecalis | Isolated from sediment shrimp ponds. Identification by Biochemical tests. Lactic fermentation for acid lactic against pathogen bacteria and mold |
| 33 | Bifidobacterium longum | Isolated from 3 days old baby meconium. Identification by Biochemical tests. Lactic fermentation for acid lactic against pathogen bacteria and mold |
| 34 | Bifidobacterium lactis | Isolated from 3 days old baby meconium. Identification by Biochemical tests. Lactic fermentation for acid lactic against pathogen bacteria and mold |
| 35 | Bifidobacterium breve | Isolated from human fermentation milk. Identification by Biochemical tests. Lactic fermentation for acid lactic against pathogen bacteria and mold |
| 36 | Bacillus clausii | Isolated from soil. Identification by Biochemical tests. |
| 37 | Rhodopseudomonas palustris | Isolated from waste water. Identification by Biochemical tests. Used in the hydrogen sulfide (H2S) removal, promoting healthy biosphere for swiftlets, facilitating pairing up and nesting |
| 38 | Paenibacillus spp. | Isolated from sediment shrimp ponds. Identification by Biochemical tests. Used in the NH3 oxidizing, promoting healthy biosphere for swiftlets, facilitating pairing up and nesting |
| 39 | Paenibacillus glycanilyticus | Isolated from fish pond. Identified by the 16S rRNA sequence. |
| 40 | Paenibacillus pectinilyticus | Isolated from fish pond. Identified by the 16S rRNA sequence. |
| 41 | Paenibacillus polymyxa | Isolated from fish pond. Identified by the 16S rRNA sequence. |
| 42 | Paenibacillus xylanexedens | Isolated from fish pond. Identified by the 16S rRNA sequence. |
| 43 | Paenibacillus endophyticus | Isolated from soil. trông. Identified by the 16S rRNA sequence. |
| 44 | Paenibacillus amylolyticus | Isolated from soil casava starch factory. Identified by the 16S rRNA sequence. |
| 45 | Paenibacillus glucanolyticus | Isolated from soil casava starch factory. Identified by the 16S rRNA sequence. |
| 46 | Paenibacillus aceti | Isolated from soil casava starch factory. Identified by the 16S rRNA sequence. |
| 47 | Paenibacillus antibioticophila | Isolated from soil. Identified by the 16S rRNA sequence. |
| 48 | Paenibacillus cellulosilyticus | Isolated from soil casava starch factory. Identified by the 16S rRNA sequence. |
| 49 | Paenibacillus humicus | Isolated from fish pond. Identified by the 16S rRNA sequence. |
| 50 | Paenibacillus xanthanilyticus | Isolated from fish pond. Identified by the 16S rRNA sequence. |
| 51 | Paenibacillus chitinolyticus | Isolated from fish pond. Identified by the 16S rRNA sequence. |
| 52 | Rhodococcus spp. | Isolated from sediment shrimp ponds. Identified by the 16S rRNA sequence. Used in the hydrogen sulfide (H2S) removal, promoting healthy biosphere for swiftlets, facilitating pairing up and nesting |
| 53 | Rhodobacter spp. | Isolated from sediment shrimp ponds. Identified by the 16S rRNA sequence. Used in the hydrogen sulfide (H2S) removal, promoting healthy biosphere for swiftlets, facilitating pairing up and nesting |
| 54 | Nitrosomonas spp. | Isolated from sediment shrimp ponds. Identified by the 16S rRNA sequence. Used in nitrogen cycle to clean up ammonia (NH3). |
| 55 | Nitrobacter spp. | Isolated from sediment shrimp ponds. Identified by the 16S rRNA sequence. Used in nitrogen cycle to clean up nitrite (N—NO2). |
| 56 | Paracoccus denitrificans | Isolated from sediment shrimp ponds. Identified by the 16S rRNA sequence. Used in the hydrogen sulfide (H2S) removal, NH3 oxidizing, promoting healthy biosphere for swiftlets, facilitating pairing up and nesting |

Continuing with step 103, in some aspects of the present invention, some functional yeasts and additional bacteria are added to the mixture of step 102.

Table 2: Some Examples of Yeasts and Bacteria Added to Improve the Living Conditions of the Swiftlet Bird Houses

| No. | Microorganisms | Description |
|---|---|---|
| 1 | Pichia anomala | Isolated from waste water vegetable oil factory. Identified by biochemial test. Biosyntheis antimold factors. Biosyntheis ethyl acetate promoting healthy biosphere for swiftlets. |
| 2 | Saccharomyces cerevisiae | Isolated from stater yeast cookies fruit wastes. Identified by biochemial test. Alcohool fermentation. |
| 3 | Rhodotorula glutinis | Isolated from fruit waste. Identification by Biochemical tests. Alcohol fermentation. |

Next, at step 104, the beneficial organisms including bacteria and yeasts are then encapsulated in a slow-releasing carrier such as nanozeolite, maize starch, cassava starch, and zeolite. These slow-releasing carriers (base) have pores and channels within their crystal structure impregnated with the above beneficial bacteria and yeasts listed in Table 1 and Table 2.

The process 100 disclosed above achieved the following objectives:

Developed a formulation of microorganisms including bacteria and yeasts that improve the living conditions for a particular farm animals using biotechnology approach.

Facilitate swiftlets to pair up and to nest.

Eliminate ammonia (NH3) in swiftlet feces.

Eliminate hydrogen sulfide (H2S).

Reduce the bad odor lingering in the bird houses.

Figure 2:
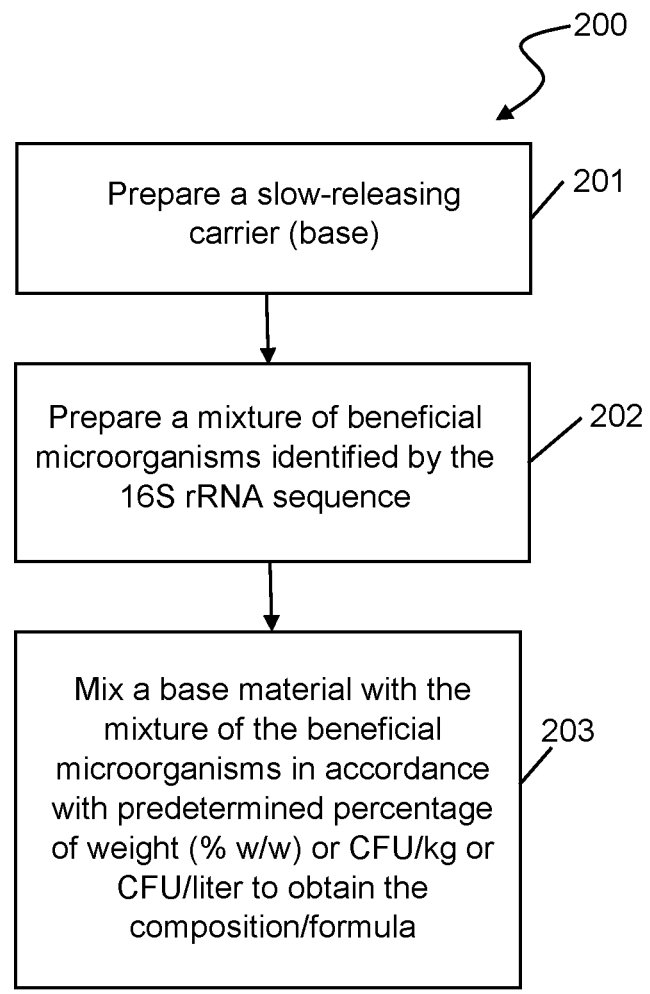
FIG. 2 is a flowchart illustrating a process of preparing a microbial composition (solution/formula) that improves the living conditions for animal farms in accordance with an exemplary embodiment of the present invention.

Next referring to FIG. 2, a method 200 illustrating a process of preparing a composition (solution/formula) that improves the living conditions in animal farms. In method 200, the order of the steps 201-202 are not critical.

At step 201, a slow-releasing carrier is prepared. In many aspects of the present invention, neozolites or the likes such as nanozeolites, zeolites, cassava starch, maize starch, etc. was selected to be the slow-releasing carrier because of its advantageous physical and chemical characteristics. In some embodiments of the present invention, nanozeolites were prepared by using a simple co-precipitation method. At first, sodium silicate solution (73.3 g/100 ml of distilled water) and 8.33 ml of ethylene glycol were mixed in a three-necked round bottom flask. Further, the flask was fitted with a reflux condenser and dropping funnels. Then, the mixture was stirred for 30 min with a magnetic stirrer at a temperature of 50-60° C. Next, a pre-prepared aluminum sulfate solution (26.23 g/83 ml) and sodium hydroxide solution (10 g/83 ml) were added dropwise while stirring and maintaining the same temperature. After completing the reaction, the pH level of the solution was neutralized. Later, the sample was filtered, dried at 105° C. and finally was annealed at 650° C. to obtain the desired porous grey colored zeolite. In various embodiments of the present invention, step 201 is realized by grinding and sieving zeolites to obtain nanozeolites.

At step 202, a mixture of beneficial microorganisms to animal farms are prepared. In many aspects of the present invention, beneficial microorganisms include both antagonistic and preventive microorganisms that not only eliminate all pathogens, toxic chemicals such as ammonium, hydrogen sulfide, nitrites but also improve all living conditions in the animal farms. In many aspects of the present invention, these microorganisms were mixed using a specific percentage by weight (% w/w) or colony-forming unit per kilogram (CFU/kg) or CFU per liter (CFU/l). Table 3 below lists the beneficial microorganisms including bacteria and yeasts used for swiftlet bird houses.

TABLE 1

Lists of Beneficial Microorganisms and Their Relative Percentage Weight (% w/w) or CFU/kg.

| No. | Microorganism | Quantity (CFU/kg) |
|---|---|---|
| 1 | *Paenibacillus favisporus* | $10^{10}$-$10^{13}$ |
| 2 | *Bacillus stratosphericus* | $10^{10}$-$10^{13}$ |
| 3 | *Paenibacilus typhea* | $10^{10}$-$10^{13}$ |
| 4 | *Bacillus aryabhattai:* | $10^{10}$-$10^{13}$ |
| 5 | *Fictibacillus phosphorivorans* | $10^{10}$-$10^{13}$ |
| 6 | *Bacillus xiamenensis* | $10^{10}$-$10^{13}$ |
| 7 | *Bacillus megaterium* | $10^{10}$-$10^{13}$ |
| 8 | *Bacillus altitudinis* | $10^{10}$-$10^{13}$ |
| 9 | *Bacillus velezensis* | $10^{10}$-$10^{13}$ |
| 10 | *Bacillus amyloliquefaciens* | $10^{10}$-$10^{13}$ |
| 11 | *Baccillus subtilis* | $10^{10}$-$10^{13}$ |
| 12 | *Baccillus licheniformis* | $10^{10}$-$10^{13}$ |
| 13 | *Bacillus mensentericus* | $10^{10}$-$10^{13}$ |
| 14 | *Bacillus pumilus* | $10^{10}$-$10^{13}$ |
| 15 | *Bacillus coagulans* | $10^{10}$-$10^{13}$ |
| 16 | *Bacillus thuringiensis* | $10^{10}$-$10^{13}$ |
| 17 | *Bacillus firmus* | $10^{10}$-$10^{13}$ |
| 18 | *Bacillus aryabhattai* | $10^{10}$-$10^{13}$ |
| 19 | *Lactobacillus acidophillus* | $10^{10}$-$10^{13}$ |
| 20 | *Lactobacillus plantarum* | $10^{10}$-$10^{13}$ |
| 21 | *Lactobacillus caseii* | $10^{10}$-$10^{13}$ |
| 22 | *Lactobacillus fermentum* | $10^{10}$-$10^{13}$ |
| 23 | *Streptococcus thermophilus* | $10^{10}$-$10^{13}$ |
| 24 | *Pediococcus acidilactici* | $10^{10}$-$10^{13}$ |
| 25 | *Lactococcus lactis* | $10^{10}$-$10^{13}$ |
| 26 | *Lactobacillus rhamnosus* | $10^{10}$-$10^{13}$ |
| 27 | *Lactobacillus reuteri* | $10^{10}$-$10^{13}$ |
| 28 | *Lactobacillus paracasei* | $10^{10}$-$10^{13}$ |
| 29 | *Lactobacillus helviticus* | $10^{10}$-$10^{13}$ |
| 30 | *Lactobacillus grasseri* | $10^{10}$-$10^{13}$ |
| 31 | *Enterococcus faecium* | $10^{10}$-$10^{13}$ |
| 32 | *Enterococcus faecalis* | $10^{10}$-$10^{13}$ |
| 33 | *Bifidobacterium longum* | $10^{10}$-$10^{13}$ |
| 34 | *Bifidobacterium lactis* | $10^{10}$-$10^{13}$ |
| 35 | *Bifidobacterium breve* | $10^{10}$-$10^{13}$ |
| 36 | *Bacillus clausii* | $10^{10}$-$10^{13}$ |
| 37 | *Rhodopseudomonas palustris* | $10^{10}$-$10^{13}$ |
| 38 | *Paenibacillus* spp. | $10^{10}$-$10^{13}$ |
| 39 | *Paenibacillus glycanilyticus* | $10^{10}$-$10^{13}$ |
| 40 | *Paenibacillus pectinilyticus* | $10^{10}$-$10^{13}$ |
| 41 | *Paenibacillus polymyxa* | $10^{10}$-$10^{13}$ |
| 42 | *Paenibacillus xylanexedens* | $10^{10}$-$10^{13}$ |
| 43 | *Paenibacillus endophyticus* | $10^{10}$-$10^{13}$ |
| 44 | *Paenibacillus amylolyticus* | $10^{10}$-$10^{13}$ |
| 45 | *Paenibacillus glucanolyticus* | $10^{10}$-$10^{13}$ |
| 46 | *Paenibacillus aceti* | $10^{10}$-$10^{13}$ |
| 47 | *Paenibacillus antibioticophila* | $10^{10}$-$10^{13}$ |
| 48 | *Paenibacillus cellulosilyticus* | $10^{10}$-$10^{13}$ |
| 49 | *Paenibacillus humicus* | $10^{10}$-$10^{13}$ |
| 50 | *Paenibacillus xanthanilyticus* | $10^{10}$-$10^{13}$ |
| 51 | *Paenibacillus chitinolyticus* | $10^{10}$-$10^{13}$ |
| 52 | *Rhodococcus* spp. | $10^{10}$-$10^{13}$ |
| 53 | *Rhodobacter* spp. | $10^{10}$-$10^{13}$ |
| 54 | *Nitrosomonas* spp. | $10^{10}$-$10^{13}$ |
| 55 | *Nitrobacter* spp. | $10^{10}$-$10^{13}$ |
| 56 | *Paracoccus denitrificans* | $10^{10}$-$10^{13}$ |
| 57 | *Pichia anomala* | $10^{10}$-$10^{13}$ |
| 58 | *Saccharomyces cerevisiae* | $10^{10}$-$10^{13}$ |
| 59 | *Rhodotorula glutinis* | $10^{10}$-$10^{13}$ |

It is noted that the list of yeasts and bacteria in Table 3 is for swiftlet bird houses. The composition for other type of animal farms with different bacteria/yeast mixture of different percentage by weight (% w/w) is within the scope of the present invention.

At step 203, the bacteria and yeasts listed in step 202 are encapsulated in the slow-releasing carriers such as nanozeolite to form the composition (solution/formula). The composition (solution/formula) was prepared by impregnating a mixture of bacteria into nanozeolites. In some embodiments of the present invention, the sample was multiplied using a Polymerase Chain Reaction (PCR) or the likes, which was then separated using a Flotweg decanter centrifuging machine with a 0.2 µm filter screen. The Room-temperature nanozeolite were mixed with water and the mixture of bacteria and yeasts were added and the composition was stirred for 3 hours. Finally, the solution was filtered, cold-dried, or vacuum dried at the temperature less than 40° C. and blended at 12,000 rpm to get fine ground particles of composition (solution/formula) that was then stored in an airtight container to stay dry. Every kilo of the powder composition is mixed with 100 liters of water before use.

Figure 3:
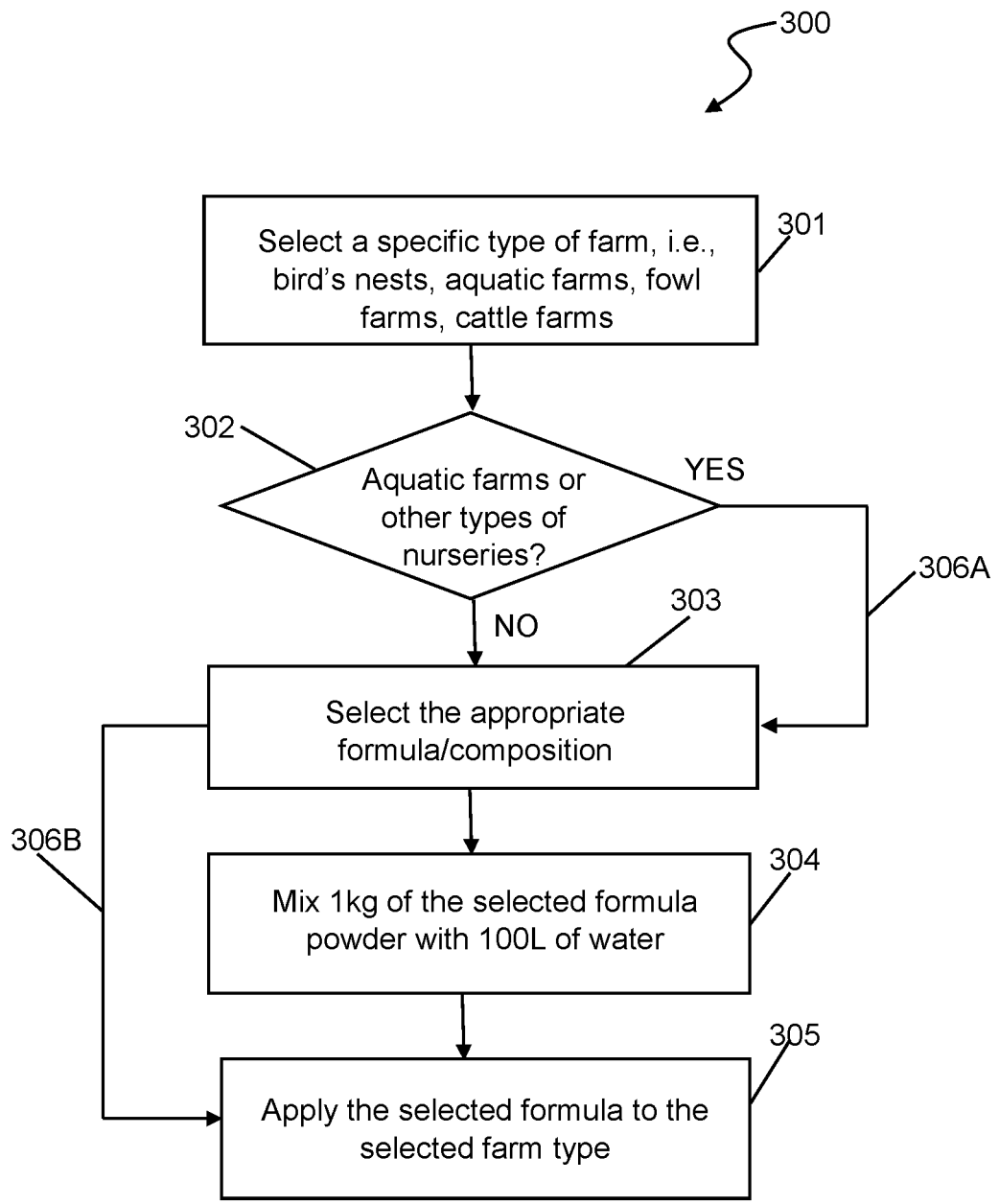
FIG. 3 is a flowchart illustrating a method of applying appropriate microbial composition (solution/formula) to the appropriate animal farms.

Next referring to FIG. 3, a flowchart illustrating a method 300 of applying appropriate composition (solution/formula) to the appropriate farm houses is shown. Method 300 of using the composition obtained from method 100 or method 200 to improve the living conditions of animal farm houses is illustrated. In some implementations, process 300 is used in swiftlet bird houses. In some other implementations, process 300 is used in other animal farm houses such as shrimp ponds, fish ponds, chicken farms, pig farms, or cow farms.

At step 301, a specific type of animal farm is selected. In many aspects of the present invention, animal farms of step 301 include but not limited to swiftlet (*Aerodramus fuciphagus, Aerodramus maximus,* and *Aerodramus spodiopy-*

*gius*) bird houses, poultry farms, enclosed cattle farms, fish and shrimp farms in aquatic ponds and nurseries.

At step 302, whether the animal farms are aquatic farms (aquafarms) or other type of aquatic surgeries and/or ponds are determined. Step 302 is implemented by determining whether the animals are aquatic creatures such as fishes, eels, frogs, and shrimps.

At step 303, if the farm animals are not aquatic, an appropriate composition (solution/formula) is selected. In many aspects of the present invention, the formula as described in method 200 is used for swiftlet bird houses.

TABLE 4

List of Beneficial Microorganism formula used in Fowl and Cattle Farms.

| No. | Microorganism | Description | Quantity (CFU/kg) |
|---|---|---|---|
| 1 | *Paenibacillus favisporus* | Isolated from catfish pond sediment. Identified by the 16S rRNA sequence. Used in nitrogen cycle to clean up ammonia ($NH_3$). | $10^{10}$-$10^{13}$ |
| 2 | *Bacillus stratosphericus* | Isolated from catfish pond sediment. Identified by the 16S rRNA sequence. Used to hydrolysis starch, biodegradable cellulose. | $10^{10}$-$10^{13}$ |
| 3 | *Peanibacillus typhea* | Isolated from catfish pond sediment. Identified by the 16S rRNA sequence. | $10^{10}$-$10^{13}$ |
| 4 | *Bacillus aryabhattai:* | Isolated from catfish pond sediment. Identified by the 16S rRNA sequence. Used to hydrolysis starch, biodegradable cellulose. | $10^{10}$-$10^{13}$ |
| 5 | *Fictibacillus phosphorivorans* | Isolated from catfish pond sediment, Identified by the 16S rRNA sequence.. | $10^{10}$-$10^{13}$ |
| 6 | *Bacillus xiamenensis* | Isolated from catfish pond sediment. Used to hydrolysis protein. Used to generate healthy environment for cattle, poultry barns. | $10^{10}$-$10^{13}$ |
| 7 | *Bacillus megaterium* | Isolatede from shrimp pond sediment. Identified by the 16S rRNA sequence. Used for phosho soluble. | $10^{10}$-$10^{13}$ |
| 8 | *Bacillus altitudinis* | Isolated from agriculture soil. Identified by the 16S rRNA sequence. Used to clean up excess metal ions. Used to hydrolysis starch. | $10^{10}$-$10^{13}$ |
| 9 | *Bacillus velezensis* | Isolated from catfish pond sediment. Identified by the 16S rRNA sequence. Used to hydrolysis starch, protein; promoting healthy biosphere for poultry, cattle barns. | $10^{10}$-$10^{13}$ |
| 10 | *Bacillus amyloliquefaciens* | Isolated from rhizosphere soil of legum. Identified by the 16S rRNA sequence. Used to hydrolysis starch, biosynthesis biofloculant. | $10^{10}$-$10^{13}$ |
| 10 | *Baccillus subtilis* | Isolated from many sources. Biosynthesis enzyme amylase, protease, lipase. Protease, bacteriocine | $10^{10}$-$10^{13}$ |
| 13 | *Baccillus licheniformis* | Isolated from sediment shrimp ponds. Biosyntheis protease, lipase to degradation organic material promoting healthy biosphere for poultry, cattle barns. | $10^{10}$-$10^{13}$ |
| 13 | *Bacillus mensentericus* | Isolated from sediment shrimp ponds. Biosyntheis amylase breakdown starch, lipase to degradation organic material promoting healthy biosphere for poultry, cattle barns. | $10^{10}$-$10^{13}$ |
| 14 | *Bacillus pumilus* | Isolated from sediment shrimp ponds. Biosynthesis enzyme amylase, biofluculant. Rapid degradation of organic material in poultry, cattle barns. | $10^{10}$-$10^{13}$ |
| 15 | *Bacillus coagulans* | Isolated from food lactic fermentation. Lactic fermentation and biosynthesis bacteriocine | $10^{10}$-$10^{13}$ |
| 16 | *Bacillus thuringiensis* | Isolated from soil. Biosynthesis endotoxin to kill pests. | $10^{10}$-$10^{13}$ |
| 17 | *Bacillus firmus* | Isolated from soil. Biosynthesis protease | $10^{10}$-$10^{13}$ |
| 18 | *Bacillus aryabhattai* | Isolated from soil. Biosynthesis enzyme cellulase, seaweeds biofluculant | $10^{10}$-$10^{13}$ |
| 19 | *Lactobacillus acidophillus* | Isolated from food fermentation. Identification by Biochemical tests. Biosynthesis bacteriocine and lactic fermentation for acid lactic against pathogen bacteria and mold. | $10^{10}$-$10^{13}$ |
| 20 | *Lactobacillus plantarum* | Isolated from pickle. Identification by Biochemical tests. Biosynthesis bacteriocine and lactic fermentation for acid lactic against pathogen bacteria and mold | $10^{10}$-$10^{13}$ |
| 21 | *Lactobacillus caseii* | Isolated from natural fermentation milk. Identification by Biochemical tests. Biosynthesis bacteriocine and Biosynthesis bacteriocine and lactic fermentation for acid lactic against pathogen bacteria and mold | $10^{10}$-$10^{13}$ |
| 22 | *Lactobacillus fermentum* | Isolated from food fermentation lactic. Identification by Biochemical tests. Biosynthesis bacteriocine and lactic fermentation for acid lactic against pathogen bacteria and mold | $10^{10}$-$10^{13}$ |
| 23 | *Streptococcus thermophilus* | Isolated from food fermentation lactic. Identification by Biochemical tests. Biosynthesis bacteriocine and lactic fermentation for acid lactic against pathogen bacteria and mold | $10^{10}$-$10^{13}$ |
| 24 | *Pediococcus acidilactici* | Isolated from food fermentation lactic. Identification by Biochemical tests. Biosynthesis bacteriocine and lactic fermentation for acid lactic against pathogen bacteria and mold | $10^{10}$-$10^{13}$ |
| 25 | *Lactococcus lactis* | Isolated from food fermentation lactic. Identification by Biochemical tests. Biosynthesis bacteriocine and lactic fermentation for acid lactic against pathogen bacteria and mold | $10^{10}$-$10^{13}$ |
| 26 | *Lactobacillus rhamnosus* | Isolated from food fermentation lactic. Identification by Biochemical tests. Biosynthesis | $10^{10}$-$10^{13}$ |

TABLE 4-continued

List of Beneficial Microorganism formula used in Fowl and Cattle Farms.

| No. | Microorganism | Description | Quantity (CFU/kg) |
|---|---|---|---|
| 27 | Lactobacillus reuteri | bacteriocine and lactic fermentation for acid lactic against pathogen bacteria and mold Isolated from food fermentation lactic. Identification by Biochemical tests. Biosynthesis bacteriocine and lactic fermentation for acid lactic against pathogen bacteria and mold | $10^{10}$-$10^{13}$ |
| 28 | Lactobacillus paracasei | Isolated from food fermentation lactic. Identification by Biochemical tests. Biosynthesis bacteriocine and lactic fermentation for acid lactic against pathogen bacteria and mold | $10^{10}$-$10^{13}$ |
| 29 | Lactobacillus helviticus | Isolated from food fermentation lactic. Identification by Biochemical tests. Biosynthesis bacteriocine and lactic fermentation for acid lactic against pathogen bacteria and mold | $10^{10}$-$10^{13}$ |
| 30 | Lactobacillus grasseri | Isolated from food fermentation lactic. Identification by Biochemical tests. Biosynthesis bacteriocine and lactic fermentation for acid lactic against pathogen bacteria and mold | $10^{10}$-$10^{13}$ |
| 31 | Enterococcus faecium | Isolated from sediment shrimp ponds. Identification by Biochemical tests. Lactic fermentation for acid lactic against pathogen bacteria and mold | $10^{10}$-$10^{13}$ |
| 32 | Enterococcus faecalis | Isolated from sediment shrimp ponds. Identification by Biochemical tests. Lactic fermentation for acid lactic against pathogen bacteria and mold | $10^{10}$-$10^{13}$ |
| 33 | Bifidobacterium longum | Isolated from 3 days old baby meconium. Identification by Biochemical tests. Lactic fermentation for acid lactic against pathogen bacteria and mold | $10^{10}$-$10^{13}$ |
| 34 | Bifidobacterium lactis | Isolated from 3 days old baby meconium. Identification by Biochemical tests. Lactic fermentation for acid lactic against pathogen bacteria and mold | $10^{10}$-$10^{13}$ |
| 35 | Bifidobacterium breve | Isolated from human fermentation milk. Identification by Biochemical tests. Lactic fermentation for acid lactic against pathogen bacteria and mold | $10^{10}$-$10^{13}$ |
| 36 | Bacillus clausii | Isolated from soil. Identification by Biochemical tests. | $10^{10}$-$10^{13}$ |
| 37 | Rhodopseudomonas palustris | Isolated from waste water. Identification by Biochemical tests. Used in the hydrogen sulfide ($H_2S$) removal, promoting healthy biosphere for poultry, cattle barns. | $10^{10}$-$10^{13}$ |
| 38 | Paenibacillus spp. | Isolated from sediment shrimp ponds. Identification by Biochemical tests. Used in the NH3 oxidizing, bio-degradation organic material, promoting healthy biosphere for poultry, cattle barns. | $10^{10}$-$10^{13}$ |
| 39 | Paenibacillus glycanilyticus | Isolated from fish pond. Identified by the 16S rRNA sequence. Bio-degradation organic material. | $10^{10}$-$10^{13}$ |
| 40 | Paenibacillus pectinilyticus | Isolated from fish pond. Identified by the 16S rRNA sequence. Bio-degradation organic material. | $10^{10}$-$10^{13}$ |
| 41 | Paenibacillus polymyxa | Isolated from fish pond. Identified by the 16S rRNA sequence. Bio-degradation organic material. | $10^{10}$-$10^{13}$ |
| 42 | Paenibacillus xylanexedens | Isolated from fish pond. Identified by the 16S rRNA sequence. Bio-degradation organic material. | $10^{10}$-$10^{13}$ |
| 43 | Paenibacillus endophyticus | Isolated from soil. trông. Identified by the 16S rRNA sequence. Bio-degradation organic material. | $10^{10}$-$10^{13}$ |
| 44 | Paenibacillus amylolyticus | Isolated from soil casava starch factory. Identified by the 16S rRNA sequence. Bio-degradation organic material. | $10^{10}$-$10^{13}$ |
| 45 | Paenibacillus glucanolyticus | Isolated from soil casava starch factory. Identified by the 16S rRNA sequence. Bio-degradation organic material. | $10^{10}$-$10^{13}$ |
| 46 | Paenibacillus aceti | Isolated from soil casava starch factory. Identified by the 16S rRNA sequence. Bio-degradation organic material. | $10^{10}$-$10^{13}$ |
| 47 | Paenibacillus antibioticophila | Isolated from soil. Identified by the 16S rRNA sequence. Bio-degradation organic material. | $10^{10}$-$10^{13}$ |
| 48 | Paenibacillus cellulosilyticus | Isolated from soil casava starch factory. Identified by the 16S rRNA sequence. | $10^{10}$-$10^{13}$ |
| 49 | Paenibacillus humicus | Isolated from fish pond. Identified by the 16S rRNA sequence. Bio-degradation organic material. | $10^{10}$-$10^{13}$ |
| 50 | Paenibacillus xanthanilyticus | Isolated from fish pond. Identified by the 16S rRNA sequence. Bio-degradation organic material. | $10^{10}$-$10^{13}$ |
| 51 | Paenibacillus chitinolyticus | Isolated from fish pond. Identified by the 16S rRNA sequence. Bio-degradation organic material. | $10^{10}$-$10^{13}$ |
| 52 | Rhodococcus spp. | Isolated from sediment shrimp ponds. Identified by the 16S rRNA sequence. Used in the hydrogen sulfide ($H_2S$) removal. promoting healthy biosphere for poultry, cattle barns. | $10^{10}$-$10^{13}$ |
| 53 | Rhodobacter spp. | Isolated from sediment shrimp ponds. Identified by the 16S rRNA sequence. Used in the hydrogen sulfide ($H_2S$) removal. promoting healthy biosphere for poultry, cattle barns. | $10^{10}$-$10^{13}$ |
| 54 | Nitrosomonas spp. | Isolated from sediment shrimp ponds. Identified by the 16S rRNA sequence. Used in nitrogen cycle to clean up ammonia ($NH_3$). | $10^{10}$-$10^{13}$ |
| 55 | Nitrobacter spp. | Isolated from sediment shrimp ponds. Identified by the 16S | $10^{10}$-$10^{13}$ |

TABLE 4-continued

List of Beneficial Microorganism formula used in Fowl and Cattle Farms.

| No. | Microorganism | Description | Quantity (CFU/kg) |
|---|---|---|---|
| 56 | Paracoccus denitrificans | rRNA sequence. Used in nitrogen cycle to clean up nitrite (N—$NO_2$). Isolated from sediment shrimp ponds. Identified by the 16S rRNA sequence. Used in the hydrogen sulfide ($H_2S$) removal. NH3 oxidizing, promoting healthy biosphere for poultry, cattle barns. | $10^{10}$-$10^{13}$ |
| 57 | Pichia anomala | Isolated from waste water vegetable oil factory. Identified by biochemical test. Biosynthesis antimold factors. Biosynthesis ethyl acetate promoting healthy biosphere for poultry, cattle barns.. | $10^{10}$-$10^{13}$ |
| 58 | Saccharomyces cerevisiae | Isolated from yeast cookies, fruit waste. Identified by biochemical test. Alcohol fermentation. | $10^{10}$-$10^{13}$ |
| 59 | Rhodotorula glutinis | Isolated from fruit waste. Identification by Biochemical tests. Alcohol fermentation. | $10^{10}$-$10^{13}$ |
| 60 | Aspergiullus oryzae | Isolated from soya fermentation process, Identification by morphology. | $10^{10}$-$10^{13}$ |
| 61 | Aspergillus nigrer | Isolated from lime, Identification by morphology. | $10^{10}$-$10^{13}$ |
| 62 | Streptomyces spp. | Isolated from forest, Identification by morphology. | $10^{10}$-$10^{13}$ |
| 63 | Paecillomyces spp. | Isolated from agriculture soil. Identification by morphology. | $10^{10}$-$10^{13}$ |
| 64 | Metarhizium spp. | Isolated from agriculture soil. Identification by morphology. | $10^{10}$-$10^{13}$ |
| 65 | Beauveria spp. | Isolated from agriculture soil. Identification by morphology. | $10^{10}$-$10^{13}$ |

At step 304, one kilogram of composition (solution/formula) powder is mixed well with 100 liters of water.

At step 305, the solution is applied thoroughly to the animal farms. In various aspects of the present invention, the microorganism solution is sprayed directly onto the surrounding walls of the animal farms. In some aspects of the present invention, the animal farm is cleaned and ridded of droppings and unwanted materials such as feathers and dusts. Then, the solution in step 304 is sprayed on the floors and the surrounding walls of the animal farms. In case of the swiftlet bird houses, bird drops or guano are removed, the grounds, the ceilings, and the surroundings on every floor are scrubbed cleaned and then the mixture of step 304 are sprayed thoroughly. Then, the symbiotic relationships between the beneficial organisms including antagonistic and other environment improving yeasts and bacteria listed in Table 1 to Table 5 above and the pathogenic agents are allowed to happen. In the nitrogen cycle, the following reactions will occur:

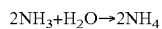

$2NH_3 + H_2O \rightarrow 2NH_4$

$NH_4^+ + 2e \rightarrow NH_2OH \rightarrow NO_2^-$

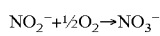

$NO_2^- + \frac{1}{2}O_2 \rightarrow NO_3^-$

On the other hand, in swiftlet bird houses and other farm animals, the level of hydrogen sulfide ($H_2S$) levels may be as high as 100 ppb. As noted in Tables above, some listed bacterium are sulfide oxidizing bacteria (SOB). The oxidation reaction occurs in the following chemical reaction: $H_2S + \frac{1}{2}O_2 \rightarrow SO_4^{2-} + 2H^+$.

At step 306, if the animal farm is an aquafarm for fishes, eels, or the likes, step 306 is performed in two stages. At step 306A, an appropriate formula for aquafarms is selected, similar to step 303. Ingredients of the farm animals applicable to aquafarms are shown in Table 5 below.

TABLE 5

Formula for Aquatic Culture (Aquaculture)

| No. | Microorganism | Description |
|---|---|---|
| 1 | Paenibacillus favisporus | Isolated from catfish pond sediment. Identified by the 16S rRNA sequence. Used in nitrogen cycle to clean up ammonia ($NH_3$). |
| 2 | Bacillus stratosphericus | Isolated from catfish pond sediment. Identified by the 16S rRNA sequence. Used to hydrolysis starch, biodegradable cellulose. |
| 3 | Peanibacilus typhea | Isolated from catfish pond sediment. Identified by the 16S rRNA sequence. |
| 4 | Bacillus aryabhattai: | Isolated from catfish pond sediment. Identified by the 16S rRNA sequence. Used to hydrolysis starch, biodegradable cellulose. |
| 5 | Fictibacillus phosphorivarans | Isolated from catfish pond sediment, Identified by the 16S rRNA sequence. |
| 6 | Bacillus xiamenensis | Isolated from catfish pond sediment. Used to hydrolysis protein. Used to generate healthy environment for aquaculture. |
| 7 | Bacillus megaterium | Isolatede from shrimp pond sediment. Identified by the 16S rRNA sequence. Used for phosphor soluble. |
| 8 | Bacillus altitudinis | Isolated from agriculture soil. Identified by the 16Sr RNA sequence. Used to clean up excess metal ions. Used to hydrolysis starch. |
| 9 | Bacillus velezensis | Isolated from catfish pond sediment. Identified by the 16S rRNA sequence. Used to hydrolysis starch, protein; promoting healthy biosphere for aquaculture. |
| 10 | Bacillus amylolique-faciens | Isolated from rhizosphere soil of legumes. Identified by the 16S rRNA sequence. Used to hydrolysis starch, biosynthesis biofloculant. |
| 11 | Baccillus subtilis | Isolated from many sources. Biosynthesis enzyme amylase, protease, lipase. Protease, bacteriocine |
| 12 | Baccillus licheniformis | Isolated from sediment shrimp ponds. Biosynthesis protease, lipase to degradation organic material promoting healthy biosphere for aquaculture. |
| 13 | Bacillus mensentericus | Isolated from sediment shrimp ponds. Biosynthesis amylase breakdown starch lipase to degradation organic material promoting healthy biosphere for aquaculture. |
| 14 | Bacillus pumilus | Isolated from sediment shrimp ponds. Biosynthesis enzyme amylase, biofluculant. Rapid degradation of organic material. |
| 15 | Bacillus coagulans | Isolated from food lactic fermentation. Lactic fermentation and biosynthesis bacteriocine |
| 16 | Bacillus thuringiensis | Isolated from soil. Biosynthesis endotoxin to kill pests. |
| 17 | Bacillus firmus | Isolated from soil. Biosynthesis protease |
| 18 | Bacillus aryabhattai | Isolated from soil. Biosynthesis enzyme cellulase, seaweed biofluculant |
| 19 | Lactobacillus acidophillus | Isolated from food fermentation. Identification by Biochemical tests. Biosynthesis bacteriocine and lactic fermentation for acid lactic against pathogen bacteria and mold. |
| 20 | Lactobacillus plantarum | Isolated from pickle. Identification by Biochemical tests. Biosynthesis bacteriocine and lactic fermentation for acid lactic against pathogen bacteria and mold |
| 21 | Lactobacillus caseii | Isolated from natural fermentation milk. Identification by Biochemical tests. Biosynthesis bacteriocine and Biosynthesis bacteriocine and lactic fermentation for acid lactic against pathogen bacteria and mold |

TABLE 5-continued

Formula for Aquatic Culture (Aquaculture)

| No. | Microorganism | Description |
|---|---|---|
| 22 | Lactobacillus fermentum | Isolated from food fermentation lactic. Identification by Biochemical tests. Biosynthesis bacteriocine and lactic fermentation for acid lactic against pathogen bacteria and mold |
| 23 | Streptococcus thermophilus | Isolated from food fermentation lactic. Identification by Biochemical tests. Biosynthesis bacteriocine and lactic fermentation for acid lactic against pathogen bacteria and mold |
| 24 | Pediococcus acidilactici | Isolated from food fermentation lactic. Identification by Biochemical tests. Biosynthesis bacteriocine and lactic fermentation for acid lactic against pathogen bacteria and mold |
| 25 | Lactococcus lactis | Isolated from food fermentation lactic. Identification by Biochemical tests. Biosynthesis bacteriocine and lactic fermentation for acid lactic against pathogen bacteria and mold |
| 26 | Lactobacillus rhamnosus | Isolated from food fermentation lactic. Identification by Biochemical tests. Biosynthesis bacteriocine and lactic fermentation for acid lactic against pathogen bacteria and mold |
| 27 | Lactobacillus reuteri | Isolated from food fermentation lactic. Identification by Biochemical tests. Biosynthesis bacteriocine and lactic fermentation for acid lactic against pathogen bacteria and mold |
| 28 | Lactobacillus paracasei | Isolated from food fermentation lactic. Identification by Biochemical tests. Biosynthesis bacteriocine and lactic fermentation for acid lactic against pathogen bacteria and mold |
| 29 | Lactobacillus helviticus | Isolated from food fermentation lactic. Identification by Biochemical tests. Biosynthesis bacteriocine and lactic fermentation for acid lactic against pathogen bacteria and mold |
| 30 | Lactobacillus grasseri | Isolated from food fermentation lactic. Identification by Biochemical tests. Biosynthesis bacteriocine and lactic fermentation for acid lactic against pathogen bacteria and mold |
| 31 | Enterococcus faecium | Isolated from sediment shrimp ponds. Identification by Biochemical tests. Lactic fermentation for acid lactic against pathogen bacteria and mold |
| 32 | Enterococcus faecalis | Isolated from sediment shrimp ponds. Identification by Biochemical tests. Lactic fermentation for acid lactic against pathogen bacteria and mold |
| 33 | Bifidobacterium longum | Isolated from 3 days old baby meconium. Identification by Biochemical tests. Lactic fermentation for acid lactic against pathogen bacteria and mold |
| 34 | Bifidobacterium lactis | Isolated from 3 days old baby meconium. Identification by Biochemical tests. Lactic fermentation for acid lactic against pathogen bacteria and mold |
| 35 | Bifidobacterium breve | Isolated from human fermentation milk. Identification by Biochemical tests. Lactic fermentation for acid lactic against pathogen bacteria and mold |
| 36 | Bacillus clausii | Isolated from soil. Identification by Biochemical tests. |
| 37 | Rhodopseudomonas palustris | Isolated from waste water. Identification by Biochemical tests. Used in the hydrogen sulfide ($H_2S$) removal. promoting healthy biosphere for aquaculture. |
| 38 | Paenibacillus spp. | Isolated from sediment shrimp ponds. Identification by Biochemical tests. Used in the NH3 oxidizing, promoting healthy biosphere for aquaculture. |
| 39 | Paenibacillus glycanilyticus | Isolated from fish pond. Identified by the 16S rRNA sequence. |
| 40 | Paenibacillus pectinilyticus | Isolated from fish pond. Identified by the 16S rRNA sequence. |
| 41 | Paenibacillus polymyxa | Isolated from fish pond. Identified by the 16S rRNA sequence. |
| 42 | Paenibacillus xylanexedens | Isolated from fish pond. Identified by the 16S rRNA sequence. |
| 43 | Paenibacillus endophyticus | Isolated from soil. Identified by the 16S rRNA sequence. |
| 44 | Paenibacillus amylolyticus | Isolated from soil casava starch factory. Identified by the 16S rRNA sequence. |
| 45 | Paenibacillus glucanolyticus | Isolated from soil casava starch factory. Identified by the 16S rRNA sequence. |
| 46 | Paenibacillus aceti | Isolated from soil casava starch factory. Identified by the 16S rRNA sequence. |
| 47 | Paenibacillus antibioticophila | Isolated from soil. Identified by the 16S rRNA sequence. |
| 48 | Paenibacillus cellulosilyticus | Isolated from soil casava starch factory. Identified by the 16S rRNA sequence. |
| 49 | Paenibacillus humicus | Isolated from fish pond. Identified by the 16S rRNA sequence. |
| 50 | Paenibacillus xanthanilyticus | Isolated from fish pond. Identified by the 16S rRNA sequence. |
| 51 | Paenibacillus chitinolyticus | Isolated from fish pond. Identified by the 16S rRNA sequence. |
| 52 | Rhodococcus spp. | Isolated from sediment shrimp ponds. Identified by the 16S rRNA sequence. Used in the hydrogen sulfide ($H_2S$) removal. promoting healthy biosphere for aquaculture |
| 53 | Rhodobacter spp. | Isolated from sediment shrimp ponds. Identified by the 16S rRNA sequence. Used in the hydrogen sulfide ($H_2S$) removal, promoting healthy biosphere for aquaculture. |
| 54 | Nitrosomonas spp. | Isolated from sediment shrimp ponds. Identified by the 16S rRNA sequence. Used in nitrogen cycle to clean up ammonia ($NH_3$). |
| 55 | Nitrobacter spp. | Isolated from sediment shrimp ponds. Identified by the 16S rRNA sequence. Used in nitrogen cycle to clean up nitrite ($N-NO_2$). |
| 56 | Paracoccus denitrificans | Isolated from sediment shrimp ponds. Identified by the 16S rRNA sequence. Used in the hydrogen sulfide ($H_2S$) removal, NH3 oxidizing, promoting healthy biosphere for aquaculture. |
| 57 | Pichia anomala | Isolated from waste water vegetable oil factory. Identified by biochemical test. |
| 58 | Saccharomyces cerevisiae | Isolated from yeast cookies, fruit wastes. Identified by biochemical test. |
| 59 | Rhodotorula glutinis | Isolated from fruit waste. Identification by Biochemical tests. |

At step 306B where step 304 is skipped, the selected formula for aquafarms in Table 5 is applied directly to the aquatic farms.

Thus, process 300 of the present disclosure achieves the following objectives:
 (a) Eliminate the excess toxic ammonia ($NH_3$) and convert them into nitrate ($NO_3^-$) that are beneficial to plants and animals since plants and animals cannot get nitrogen ($N_2$) directly from the environment. They get the essential nitrogen from nitrate ions ($NO_3^-$).
 (b) Eliminate hydrogen sulfide ($H_2S$) trapped in the bird house;
 (c) Get rid of the bad odors lingering in the bird houses;
 (d) Decompose swiftlets guano.

Figure 4A:
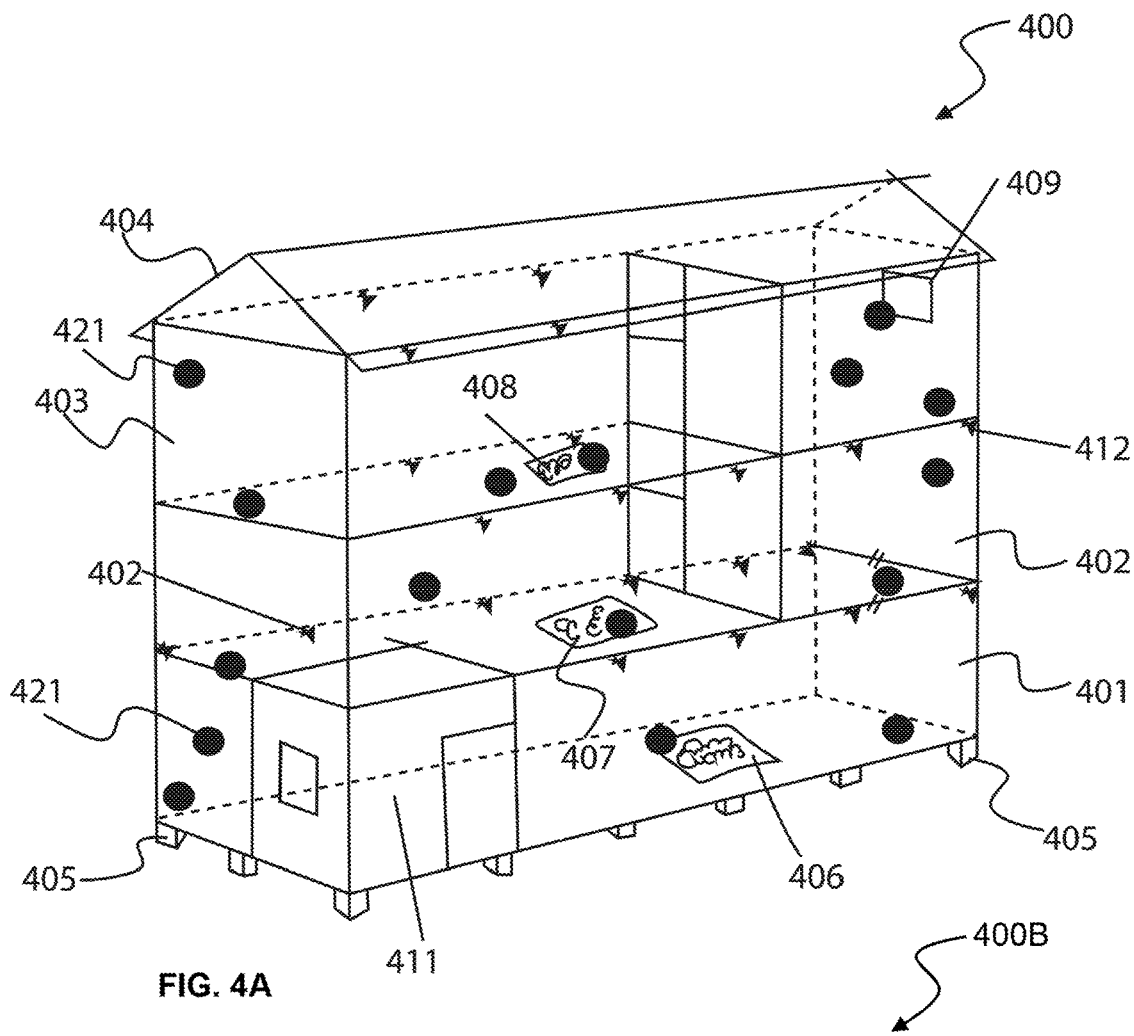
FIG. 4A illustrates a typical swiftlet bird house that requires of the microbial composition (solution/formula) in accordance with an exemplary embodiment of the present invention.

Next referring to FIG. 4A, a typical swiftlet bird house 400 that requires of the composition (solution/formula) to ameliorate the living conditions and to promote the quality of the edible bird's nests (EBN) in accordance with an exemplary embodiment of the present invention is illustrated. The key to a successful animal farm operations lies in the house. More particularly, the keys to a successful edible bird's nest commercialization lies in swiftlet bird house 400.

Swiftlet bird house 400 typically has a rectangular structure with a plurality of floors (levels) 401-403. A roof 404 covers the top the rectangular structure. A set of foundation and footings 405 are used to support bird house 400 from the bottom side. A first ground (platform) on ground floor 401 may be covered with a first removable rug 406. A second ground (platform) on first floor 402 may be covered with a second removable rug 407. A second ground (platform) on second floor 403 may be covered with a third removable rug 408. First to third removable rug 406 to 408 may be made of graphene or guano-doped graphene. During clean-up, these removable rugs 406-408 can be removed to collect the guano. A small window 409—usually very narrow—is for exit and entrance of the swiftlets. A computer box 411 is placed either inside or away from bird house 400 contains speaker controller and/or a computer to receive information from sensors 421 that carefully placed to collect the bio information. A series of speakers 412 are placed on the surrounding walls to attract the swiftlets. Sensors 421 are served as crowd-sensing including temperatures sensors, cameras, air/gas detectors, chemical, mirrors, and bacteria sensors. Sensors 421 send information to a central processing unit (CPU) (not shown) inside computer box 411. In some embodiments, sensors 421 send information to a portable devices such as smart phones, laptops, or tablets.

Figure 4B:
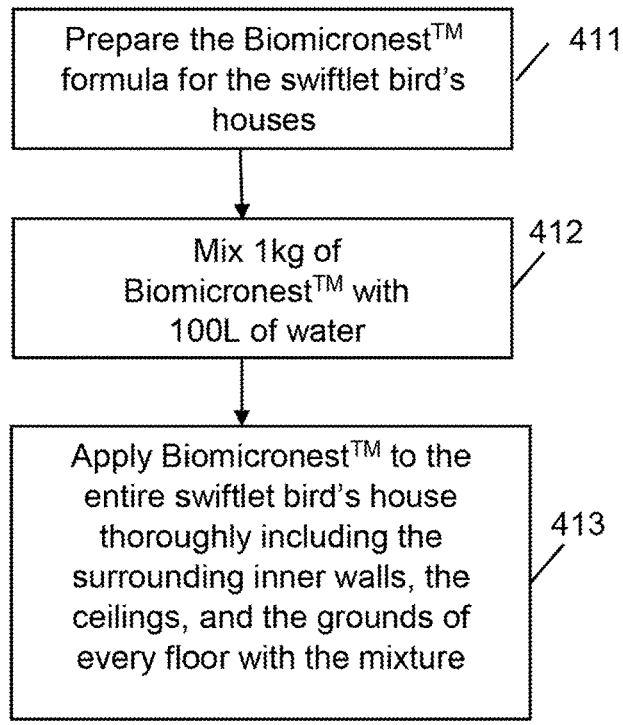
FIG. 4B is a flowchart illustrating a method of using a microbial composition (solution/formula) to the living conditions of the swiftlet bird houses including hygienic, nest-building, and pathogen-free in accordance with an exemplary embodiment of the present invention.

Finally, referring to FIG. 4B, is a flowchart illustrating a method 400B of using a composition (solution/formula) to the living conditions of the swiftlet bird house including hygienic, nest-building, and pathogen-free is illustrated.

At step 401, a formula for swiftlet bird houses composition (solution/formula) is prepared. In many aspects of the present invention, the composition (solution/formula) contains the exact percentage weigh (% w/w) since overabundance of a particular bacteria may be detrimental to swiftlet bird house 400. Step 401 is realized by the composition (solution/formula) containing the components as listed in Table 3. In some aspects of the present invention, the composition (solution/formula) is freeze-dried to create a powder formula.

At step 402, every kilo of the composition (solution/formula) is mixed with 100 liters of water. In some aspects of the present invention gel and liquid form of the composition are used.

At step 403, the swiftlet bird house is sprayed thoroughly with the mixture of step 402 above. In practice, step 403 is realized by cleaning up swiftlet bird house 400 and sprayed the surrounding walls of ground floor 401, first floor 402, and second floor 403 as well as ceiling and roof 404. In some aspects of the present invention, the animal farms can be newly built or existing buildings made of either cement, bricks, or woods. The compositions in the form of gel, liquid, solid, and/or power are within the scope of the present invention.

In summary, the novel compositions of the present invention as disclosed above achieve the following objectives:

A total microorganism solution (solution/formula) to improve the living conditions in animal farm houses, especially swiftlet bird houses.

a microorganism composition (solution/formula) capable of decomposing swiftlet droppings (guano) in the bird houses to prevent toxic gases and other polluting agents from accumulating.

a microorganism composition (solution/formula) capable of helping said bird's nests to be healthy white color;

a microorganism composition (solution/formula) capable of helping swiftlets to stay healthy, increasing the number of bird nests whose fibers are sturdy, flexible, long-stranded, and unbroken.

a microorganism composition (solution/formula) capable of preventing insects such as aunts, mites, and bugs from killing the swiftlet newly born chicks;

a microorganism composition (solution/formula) capable of preventing fungi from growing on the nest supporting wooden bars, on the surrounding walls, and on the floors.

a microorganism composition (solution/formula) capable of preventing parasites from growing from the accumulated swiftlet's droppings (guano) that can adversely affect the swiftlets and their nests.

a microorganism composition (solution/formula) capable of attracting the swiftlets to come dwelling inside the bird houses;

a microorganism composition (solution/formula) capable of keeping the swiftlets from leaving the bird houses;

a microorganism composition (solution/formula) capable of causing the swiftlets to pair up and to nest in the bird houses;

a microorganism composition (solution/formula) capable of making the newly born swiftlet chicks to feel comfortable in their nests;

a microorganism composition (solution/formula) capable of keeping the swiftlet chicks to stay and to nest in their bird houses where they were born;

a microorganism composition (solution/formula) capable of increasing the number of bird's nests per bird house;

a microorganism composition (solution/formula) capable of shortening the edible bird's nests (EBN) harvesting time;

a microorganism composition (solution/formula) capable of lengthening the durability and the longevity of the bird houses;

a microorganism composition capable (solution/formula) of stimulating the reproduction of the swiftlets;

a microorganism composition (solution/formula) capable of eliminating the new cement odors of a newly built bird house;

a microorganism composition (solution/formula) capable of eliminating the smells of new woods inside the bird houses that dispel the swiftlets;

a microorganism composition (solution/formula) capable of eliminating the rotten smells of the molds and fungi in the old swiftlet houses, improving the living conditions of the existing and old swiftlet houses;

a microorganism composition (solution/formula) capable of quickly stabilizing the quality air inside newly built bird houses;

a microorganism composition (solution/formula) capable of reducing stresses to swiftlets;

a microorganism composition (solution/formula) capable of recreating a healthy and conducive environment to the swiftlets;

a microorganism composition (solution/formula) capable of eliminating hydrogen sulfide ($H_2S$) and nitrite ($NO_2^-$), ammonia ($NH_3$), and nitrate ($NO_3^-$) accumulated over time inside the bird houses;

a microorganism composition (solution/formula) capable of increasing the nutritional values and proteins in the edible bird's nests (EBN).

a microorganism composition (solution/formula) capable of decomposing animal manure after being collected from animal farms such as barns, bird houses, fowl houses to minimize pollution to the surrounding environment and the final product can be used as a safe fertilizer for trees, plants, and the green environment.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Example: Preparation of the Microorganism Solutions/Formula/Compositions

An exemplary nanozeolite was prepared by using a simple co-precipitation method. At first, sodium silicate solution (73.3 g/100 ml of distilled water) and 8.33 ml of ethylene glycol were mixed in a three-necked round bottom flask. Further, the flask was fitted with a reflux condenser and dropping funnels. Then, the mixture was stirred for 30 min with a magnetic stirrer at a temperature of 50-60° C. Next, a pre-prepared aluminum sulfate solution (26.23 g/83 ml) and sodium hydroxide solution (10 g/83 ml) were added dropwise while stirring and maintaining the same temperature. After completing the reaction, the pH level of the solution was neutralized. Later, the sample was filtered, dried at 105° C. and finally was annealed at 650° C. to obtain the desired porous grey colored zeolite.

In commercial practice, zeolite materials were purchased and grinded into nanozeolites using ball milling apparatus and sieving machines.

The beneficial organisms including bacteria and yeasts were selected in accordance with the Tables 1-5 above.

Other forms of base materials such as zeolite, maize starch, cassava starch, or starches from tubers were also used.

The mixture of base material and the selected beneficial microorganisms can be either in the form of liquid, dried powder, or gel. To obtain the liquid form, the mixture was emulsified with 10% to 20% sucrose.

The result mixture was called Biomicronest™, Micronest™, Biomicroer™ Bioenhancer™, Bioaquaer™, Biostimuler™, Biophobobionest™, and Organiqua™ which are microorganism-based formulas or compositions for improving the living conditions in animal farms such as edible bird nests.

EXPERIMENTS

Experiment 1: Hydrogen Sulfide ($H_2S$) Reduction

Some bacteria listed in Table 1-Table 5 express strong hydrogen sulfide ($H_2S$) reduction capabilities. In the fowl and swiftlet bird houses, the observed samples of hydrogen sulfide ($H_2S$) were 1-10 ppm. More than 10 times the amount of $H_2S$ found in swiftlet houses (122 mg/liter) were mixed in vitro with bacteria in Table 1-Table 5. The following results were reported:

The first $H_2S$ sample in column 1 of Table 6 without any $H_2S$ reducing bacteria was used for the purpose of comparison. Those samples infested with bacteria from Tables 1-5 showed that the amount of $H_2S$ reduced over the period of 48 hours was almost 80% faster than the compared sample free of bacteria.

TABLE 6

$H_2S$ Reduction Capabilities of Bacteria Used in the Present Invention

| No. Observed Samples | Remaining $H_2S$ in Samples Overtime (mg/l) | | | | |
|---|---|---|---|---|---|
| | 0 h | 6 h | 24 h | 30 h | 48 h |
| 1 Sample free of Bacteria | $112^a \pm 0.00$ | $112^e \pm 0.00$ | $80^e \pm 0.00$ | $48^d \pm 0.00$ | $48^e \pm 0.00$ |
| 2 Xanthomonas spp. | $144^c \pm 0.00$ | $80^a \pm 0.00$ | $48^c \pm 0.00$ | $40^c \pm 0.04$ | $48^e \pm 0.00$ |
| 3 Xanthomonas bromi | $112^a \pm 0.00$ | $112^e \pm 0.00$ | $48^c \pm 0.00$ | $48^d \pm 0.00$ | $32^c \pm 0.07$ |
| 4 Rhothia amarae | $128^b \pm 0.07$ | $112^e \pm 0.00$ | $48^c \pm 0.00$ | $48^d \pm 0.00$ | $48^e \pm 0.00$ |
| 5 Rhodopseudomonas palustris | $112^a \pm 0.00$ | $104^d \pm 0.04$ | $48^c \pm 0.00$ | $16^a \pm 0.00$ | $16^a \pm 0.00$ |
| 6 Paracoccus denitrificans | $112^a \pm 0.00$ | $88^b \pm 0.04$ | $64^d \pm 0.07$ | $40^c \pm 0.04$ | $16^a \pm 0.00$ |
| 7 Pseudomonas spp. | $144^c \pm 0.00$ | $96^c \pm 0.07$ | $48^c \pm 0.00$ | $32^b \pm 0.07$ | $32^c \pm 0.07$ |
| 8 Pseudomonas spp. | $112^a \pm 0.00$ | $112^e \pm 0.00$ | $48^c \pm 0.00$ | $40^c \pm 0.04$ | $48^e \pm 0.00$ |
| 9 Xanthomonas spp. | $112^a \pm 0.00$ | $80^a \pm 0.00$ | $48^c \pm 0.00$ | $48^d \pm 0.00$ | $48^e \pm 0.00$ |
| 10 Rhodococcus spp. | $112^a \pm 0.00$ | $96^c \pm 0.07$ | $24^a \pm 0.04$ | $16^a \pm 0.00$ | $16^a \pm 0.00$ |
| 11 Xanthomonas spp. | $144^c \pm 0.00$ | $112^e \pm 0.00$ | $80^e \pm 0.00$ | $48^d \pm 0.00$ | $40^d \pm 0.04$ |
| 12 Paracoccus denitrificans | $112^a \pm 0.00$ | $80^a \pm 0.00$ | $40^b \pm 0.04$ | $40^c \pm 0.04$ | $24^b \pm 0.04$ |

The beneficial organisms were extracted as described in Tables 1-5 above. The sample was multiplied using a Polymerase Chain Reaction (PCR) or the like, which was then separated using a Flotweg decanter centrifuging machine with a 0.2 μm filter screen. The composition (solution/formula) was prepared by impregnating a mixture of bacteria into nanozeolites. Room-temperature nanozeolites were mixed with water and the mixture of bacteria were added and the composition was stirred for 3 hours. Finally, the solution was filtered, cold-dried, or vacuum dried at the temperature less than 40° C. and blended at 12,000 rpm to get fine ground particles of composition (solution/formula) that was then stored in an airtight container to stay dry. Every kilo of the powder composition is mixed with 100 liters of water before use.

Experiment 2: Ammonia Oxidation

Some bacteria listed in Table 1-Table 5 express strong nitrifying capabilities. In the fowl and swiftlet bird houses, the amount of ammonia in guano was accumulated to toxic level that would cause swiftlets to leave their nests. The initial amount of ammonia of 10 mg/liter were mixed in vitro with bacteria in Table 1-Table 5. The following results were reported:

The first ammonia ($NH_3$) sample in column 1 of Table 6 without any nitrifying bacteria was used for the purpose of comparison. Those samples infested with bacteria from Tables 1-5 showed that the amount of initial ammonia reduced over the period of 48 hours was almost 90% faster than the compared sample free of nitrifying bacteria.

TABLE 7

TOTAL AMMONIA NITROGEN (TAN) OXIDATION CAPABILITIES

| Bacteria | Time (Hr) Amount of $NH_4^+$ (mg/l) | | | | | |
|---|---|---|---|---|---|---|
| | 0 | 24 | 48 | 72 | 96 | 120 |
| Compared Sample Free of Microorganisms | $10.7^a \pm 0.01$ | $10.3^r \pm 0.01$ | $10.2^r \pm 0.01$ | $10.1^q \pm 0.00$ | $9.8^o \pm 0.01$ | $9.8^t \pm 0.01$ |
| Pseudomonas spp. | $10.2^a \pm 0.00$ | $3.8^{cd} \pm 0.01$ | $2.9^{efgh} \pm 0.00$ | $2.2^{bc} \pm 0.00$ | $2.0^{ghi} \pm 0.01$ | $1.8^{mn} \pm 0.01$ |
| Pantoea agglomerans | $9.92^a \pm 0.00$ | $4.8^{gh} \pm 0.01$ | $3.1^{fghi} \pm 0.00$ | $2.5^{cd} \pm 0.00$ | $1.9^{ghi} \pm 0.01$ | $1.7^l \pm 0.01$ |
| Klebsiella spp. | $10.2^a \pm 0.01$ | $7.0^o \pm 0.01$ | $3.9^{jk} \pm 0.00$ | $2.7^{ef} \pm 0.00$ | $2.3^{hij} \pm 0.01$ | $2.3^p \pm 0.01$ |
| Nitrosomonas marina | $10.1^a \pm 0.01$ | $4.6^{gh} \pm 0.02$ | $4.3^k \pm 0.01$ | $3.9^{jk} \pm 0.00$ | $3.5^m \pm 0.01$ | $3.3^s \pm 0.01$ |
| Nitrosomonas marina | $10.4^a \pm 0.01$ | $1.7^a \pm 0.01$ | $1.2^a \pm 0.01$ | $0.8^a \pm 0.00$ | $0.8^a \pm 0.01$ | $0.7^c \pm 0.01$ |
| Paenibacillus pasadenensis | $10.2^a \pm 0.01$ | $2.7^b \pm 0.02$ | $2.2^{bc} \pm 0.01$ | $1.7^b \pm 0.00$ | $1.3^{bc} \pm 0.01$ | $1.0^{de} \pm 0.01$ |
| Aeromnas sp. | $10.1^a \pm 0.01$ | $2.6^b \pm 0.02$ | $1.9^b \pm 0.01$ | $1.2^b \pm 0.00$ | $1.1^b \pm 0.01$ | $1.1^{ef} \pm 0.01$ |
| Pseudomonas spp. | $10.4^a \pm 0.01$ | $5.5^b \pm 0.02$ | $3.4^{hij} \pm 0.01$ | $2.0^b \pm 0.01$ | $1.5^{cd} \pm 0.01$ | $1.2^f \pm 0.01$ |
| Bacillus sp. | $10.2^a \pm 0.02$ | $3.6^c \pm 0.03$ | $2.6^{cdef} \pm 0.01$ | $1.0^a \pm 0.01$ | $0.8^a \pm 0.01$ | $0.8^{cd} \pm 0.01$ |
| Pseudomonas spp. | $10.1^a \pm 0.03$ | $3.9^{cde} \pm 0.04$ | $2.4^{cd} \pm 0.01$ | $1.3^b \pm 0.02$ | $1.1^b \pm 0.02$ | $0.1^a \pm 0.01$ |
| Paracoccus denitrificans | $10.1^a \pm 0.02$ | $4.3^{ef} \pm 0.03$ | $2.2^{bc} \pm 0.01$ | $1.5^b \pm 0.01$ | $1.1^b \pm 0.01$ | $1.0^{de} \pm 0.01$ |
| Kocuria rhizophila | $10.4^a \pm 0.02$ | $5.1^{hij} \pm 0.04$ | $3.3^h \pm 0.01$ | $1.2^b \pm 0.02$ | $1.0^b \pm 0.02$ | $0.2^a \pm 0.01$ |
| Pseudomonas spp. | $10.2^a \pm 0.03$ | $2.4^b \pm 0.04$ | $2.2^{bc} \pm 0.01$ | $1.9^{bc} \pm 0.02$ | $1.8^{gh} \pm 0.02$ | $1.9^{no} \pm 0.01$ |
| Ochrobactrum spp. | $10.1^a \pm 0.04$ | $5.5^{jkl} \pm 0.06$ | $2.6^{cdef} \pm 0.02$ | $2.0^{bc} \pm 0.04$ | $1.8^{gh} \pm 0.02$ | $1.7^l \pm 0.01$ |
| Burkholderia spp. | $10.2^a \pm 0.04$ | $6.0^{mn} \pm 0.05$ | $3.1^{fghi} \pm 0.02$ | $2.7^{ef} \pm 0.03$ | $2.4^{hi} \pm 0.02$ | $2.3^p \pm 0.01$ |
| Solibacillus kalamii | $9.91^a \pm 0.04$ | $4.1^{de} \pm 0.05$ | $2.7^{defg} \pm 0.02$ | $1.9^{bc} \pm 0.03$ | $1.8^{gh} \pm 0.02$ | $1.6^{jk} \pm 0.01$ |
| Proteus spp. | $10.2^a \pm 0.01$ | $5.0^{ghi} \pm 0.01$ | $2.4^{bcde} \pm 0.01$ | $1.7^{bc} \pm 0.00$ | $1.5^{cd} \pm 0.01$ | $1.5^j \pm 0.01$ |
| Paenibacillus typhae | $10.2^a \pm 0.01$ | $6.7^o \pm 0.01$ | $2.6^{cdef} \pm 0.01$ | $2.2^{cd} \pm 0.00$ | $2.0^{ghi} \pm 0.01$ | $1.6^{jk} \pm 0.01$ |
| Bacillus spp. | $10.4^a \pm 0.01$ | $5.3^{jkl} \pm 0.02$ | $2.7^{def} \pm 0.01$ | $1.9^c \pm 0.00$ | $1.8^{gh} \pm 0.01$ | $1.8^{lm} \pm 0.01$ |
| Paenibacillus aceti | $10.4^a \pm 0.01$ | $6.2^n \pm 0.02$ | $2.9^{efgh} \pm 0.01$ | $2.4^{cd} \pm 0.01$ | $2.0^{ghi} \pm 0.01$ | $1.7^l \pm 0.01$ |
| Paenibacillus glucanolyticus | $10.1^a \pm 0.02$ | $5.7^{klm} \pm 0.04$ | $3.6^{ij} \pm 0.01$ | $3.2^{ghi} \pm 0.01$ | $2.9^{jkl} \pm 0.02$ | $2.5^{qr} \pm 0.01$ |
| Paenibacillus lautus | $10.2^a \pm 0.02$ | $5.8^{lmn} \pm 0.04$ | $3.3^{ghi} \pm 0.01$ | $2.9^{fg} \pm 0.02$ | $2.8^{jkl} \pm 0.02$ | $2.6^q \pm 0.01$ |
| Paracoccus denitrificans | $10.9^a \pm 0.03$ | $7.1^o \pm 0.04$ | $4.6^{klm} \pm 0.02$ | $3.0^{fg} \pm 0.02$ | $2.9^{jkl} \pm 0.02$ | $2.3^p \pm 0.01$ |
| Nitrosomonas spp. | $10.1^a \pm 0.03$ | $3.2^{cd} \pm 0.05$ | $2.3^{cd} \pm 0.02$ | $1.5^{b,c} \pm 0.02$ | $0.9^a \pm 0.02$ | $0.1^a \pm 0.01$ |
| Nitrospira sp. | $10.8^a \pm 0.04$ | $6.7° \pm 0.06$ | $4.6^{klm} \pm 0.02$ | $4.3^{lm} \pm 0.04$ | $3.6^{mn} \pm 0.02$ | $2.5 \pm 0.01$ |
| Nitrosococcus halophilus | $10.8^a \pm 0.04$ | $2.8^{cd} \pm 0.06$ | $2.2^{bc} \pm 0.02$ | $1.6^{bc} \pm 0.04$ | $1.4^{cd} \pm 0.02$ | $0.7^c \pm 0.01$ |
| Rothia endophytica | $10.9^a \pm 0.05$ | $7.2° \pm 0.07$ | $5.1^{lmn} \pm 0.02$ | $3.7^{hi} \pm 0.06$ | $2.1^{hi} \pm 0.02$ | $0.5^b \pm 0.01$ |
| Nitrobacter winogradskyi | $10.7^a \pm 0.05$ | $6.8° \pm 0.07$ | $3.3^{ghi} \pm 0.02$ | $2.1^{cd} \pm 0.06$ | $1.9^{ghi} \pm 0.02$ | $1.4^{ij} \pm 0.01$ |
| Nitrosomonas spp. | $10.6^a \pm 0.05$ | $4.0^{cde} \pm 0.08$ | $3.7^{ij} \pm 0.02$ | $2.8^{fg} \pm 0.08$ | $1.9^{ghi} \pm 0.03$ | $1.6^{jk} \pm 0.01$ |
| Paenibacillus durus | $10.9^a \pm 0.06$ | $5.9^{mn} \pm 0.09$ | $2.3^{cd} \pm 0.03$ | $2.1^{cd} \pm 0.1$ | $1.3^{bc} \pm 0.03$ | $0.6^{bc} \pm 0.01$ |
| Nitrobacter spp. | $10.4^a \pm 0.07$ | $8.5^p \pm 0.11$ | $5.6^{mno} \pm 0.03$ | $2.6^{ef} \pm 0.14$ | $1.5^{bc} \pm 0.03$ | $1.3^i \pm 0.01$ |
| Paenibacillus favisporus | $9.83^a \pm 0.07$ | $5.6^{kl} \pm 0.11$ | $4.3^{kl} \pm 0.03$ | $3.1^{ghi} \pm 0.14$ | $2.4^{hij} \pm 0.03$ | $1.2^f \pm 0.01$ |
| Paenibacillus endophyticus | $10.1^a \pm 0.08$ | $7.8^{op} \pm 0.11$ | $6.2^{op} \pm 0.03$ | $5.4^{mn} \pm 0.16$ | $3.9^{op} \pm 0.04$ | $2.7^q \pm 0.01$ |
| Paenibacillus glycanilyticus | $9.79^a \pm 0.02$ | $8.4^p \pm 0.02$ | $7.5^{pq} \pm 0.01$ | $6.3^{no} \pm 0.01$ | $2.5^{ij} \pm 0.01$ | $0.9^d \pm 0.01$ |
| Nitrobacter winogradskyi | $9.87^a \pm 0.03$ | $7.6^{op} \pm 0.04$ | $5.3^{lmn} \pm 0.02$ | $3.6^{hij} \pm 0.02$ | $2.9^{jkl} \pm 0.02$ | $1.2^f \pm 0.01$ |
| Paenibacillus pectinilyticus | $10.3^a \pm 0.06$ | $9.2^q \pm 0.09$ | $8.6^{qr} \pm 0.03$ | $6.5^{op} \pm 0.09$ | $3.1^{kl} \pm 0.03$ | $1.6^{jk} \pm 0.01$ |

Experiment 3: Feces Decomposition Bioactivities of Beneficial Microorganisms

The beneficial microorganisms listed in Tables 1-5 above were tested for their feces decomposing bioactivities. Animal fecal samples taken from animal farms contain casein, carbohydrates, lipid, and cellulose. These samples were mixed with the beneficial microorganisms listed in Tables 1-5 above and the results were recorded in Tables 8-11 below.

TABLE 8

Casein Decomposing Capability of Beneficial Microorganisms

| Microorganisms | The Radii of Decomposition(cm)$_{TB}$ | Bioactivities (U/ml) |
|---|---|---|
| Bacillus megaterium | $1.5^b \pm 0.02$ | $14.13^c \pm 0.01$ |
| Aeromonas veronii | $2.2^d \pm 0.03$ | $22.5^e \pm 0.03$ |
| Fictibacillus phosphorivorans | $1.3^a \pm 0.01$ | $8.54^a \pm 0.01$ |
| Vogesella amnigena | $1.2^a \pm 0.02$ | $7.15^a \pm 0.02$ |
| Bacillus xiamenensis | $1.3^a \pm 0.02$ | $9.19^b \pm 0.01$ |
| Paenibacillus humicus | $2.8^e \pm 0.03$ | $24.97 \pm 0.03$ |
| Jeotgalibacillus spp. | $1.7^c \pm 0.01$ | $14.02^c \pm 0.03$ |
| Pseudomonas spp. | $1.7^c \pm 0.02$ | $11.34^{bc} \pm 0.01$ |
| Lysinibacillus spp. | $2.3^d \pm 0.03$ | $21.96^d \pm 0.03$ |

TABLE 9

The Radii of Carbohydrates Decomposition of the Beneficial Organisms

| Microorganisms | The Radii of Decomposition(cm)$_{TB}$ | Bioactivities (U/ml) |
|---|---|---|
| Bacillus pumilus | $0.5^c \pm 0.02$ | $5.1^d \pm 0.01$ |
| Bacillus amyloliquefaciens | $3.6^i \pm 0.02$ | $32.1^i \pm 0.03$ |
| Paenibacillus amylolyticus | $0.7^d \pm 0.01$ | $7.1^e \pm 0.03$ |
| Fictibacillus spp. | $1.7^f \pm 0.02$ | $14.8^h \pm 0.01$ |
| Aeromonas jandaei | $0.3^b \pm 0.01$ | $2.7^c \pm 0.03$ |
| Bacillus xiamenensis | $0.8^d \pm 0.03$ | $7.0^e \pm 0.02$ |
| Paenibacillus catalpae | $0.9^e \pm 0.02$ | $8.1^f \pm 0.01$ |
| Streptomyces sp. | $0.9^e \pm 0.01$ | $8.2^f \pm 0.02$ |
| Brevibacillus parabrevis | $0.6^c \pm 0.02$ | $6.0^d \pm 0.01$ |
| Bacillus spp. | $0.9^e \pm 0.02$ | $7.9^e \pm 0.02$ |
| Bacillus spp. | $2.8^h \pm 0.03$ | $13.2^{gh} \pm 0.01$ |
| Bacillus spp. | $2.3^g \pm 0.02$ | $12.1^g \pm 0.03$ |
| Bacillus sp. | $0.6^c \pm 0.01$ | $6.1^d \pm 0.01$ |
| Bacillus alritudinis | $0.2^b \pm 0.03$ | $1.7^b \pm 0.03$ |
| Bacillus velezensis | $0^a \pm 0.02$ | $1.1^a \pm 0.01$ |
| Bacillus spp. | $0.3^b \pm 0.02$ | $2.6^c \pm 0.02$ |
| Bacillus spp. | $1.0^e \pm 0.01$ | $11.2^g \pm 0.01$ |

TABLE 10

Cellulase Bioactivities of Beneficial Microorganisms

| Microorganisms | The Radii of Decomposition(cm)$_{TB}$ | Bioactivities (U/ml) |
|---|---|---|
| Paenibacillus odorifer | $2.1^i \pm 0.12$ | $24.4^i \pm 0.35$ |
| Bacillus spp. | $5.0^k \pm 0.21$ | $32.1^k \pm 0.57$ |
| Paenibacillus catalpae | $1.8^f \pm 0.15$ | $19.4^g \pm 0.28$ |
| Paenibacillus xylanexedens | $1.8^f \pm 0.14$ | $22.5^h \pm 0.25$ |
| Bacillus stratosphericus | $0.5^a \pm 0.16$ | $8.1^a \pm 0.36$ |
| Paenibacillus cellulosilyticus | $1.4^d \pm 0.35$ | $16.3^{ef} \pm 0.64$ |
| Bacillus xiamenensis | $1.4^d \pm 0.23$ | $18.1^g \pm 0.24$ |
| Acidovorax spp. | $1.6^e \pm 0.32$ | $13.2^d \pm 0.24$ |
| Fictibacillus phosphorivorans | $1.0^{ab} \pm 0.46$ | $9.2^a \pm 0.24$ |
| Bacillus aryabhattai | $2.3^j \pm 0.23$ | $22.1^h \pm 0.35$ |
| Bacillus spp. | $1.4^d \pm 0.24$ | $19.3^g \pm 0.27$ |
| Lysinibacillus spp. | $2.4^j \pm 0.42$ | $30.1^j \pm 0.48$ |
| Pantoea eucalypti | $5.5^l \pm 0.43$ | $47.3^l \pm 0.36$ |
| Paenibacillus xylanexedens | $1.1^b \pm 0.24$ | $9.2^a \pm 0.35$ |
| Bacillus spp. | $1.9^f \pm 0.46$ | $21.3^h \pm 0.25$ |
| Paenibacillus xylanilyticus | $1.2^c \pm 0.25$ | $10.3^c \pm 0.53$ |
| Stenotrophomonas maltophilia | $0.9^a \pm 0.37$ | $8.5^a \pm 0.73$ |
| Paenibacillus cellulositrophicus | $1.3^{cd} \pm 0.24$ | $15.1^e \pm 0.46$ |
| Paenibacillus mendelii | $2.2^i \pm 0.25$ | $19.2^g \pm 0.25$ |
| Paenibacillus chitinolyticus | $1.6^e \pm 0.23$ | $17.1^f \pm 0.56$ |
| Paenibacillus pasadenensis | $2.2^i \pm 0.24$ | $24.2^i \pm 0.56$ |

TABLE 11

Lipase Bioactivities of Beneficial Microorganisms

| Microorganisms | The Radii of Decomposition(cm)$_{TB}$ | Bioactivities (U/ml) |
|---|---|---|
| Paenibacillus catalpae | $1.7^e \pm 0.46$ | $11.43^c \pm 0.67$ |
| Bacillus stratosphericus | $0.9^a \pm 0.32$ | $5.76^a \pm 0.56$ |
| Xanthomonas spp. | $2.2^f \pm 0.54$ | $12.32c \pm 0.72$ |
| Lysinibacillus fusiformis | $2.6^f \pm 0.42$ | $13.34^d \pm 0.45$ |
| Bacillus altitudinis | $1.3^c \pm 0.23$ | $6.13^a \pm 0.43$ |
| Paenibacillus polymyxa | $2.9^h \pm 0.26$ | $23.34^h \pm 0.43$ |
| Paenibacillus typhae | $2.1^{ef} \pm 0.24$ | $15.54^e \pm 0.67$ |
| Bacillus spp. | $2.6^f \pm 0.45$ | $13.32^d \pm 0.25$ |
| Paenibacillus antibioticophila | $1.6^d \pm 0.23$ | $15.75^e \pm 0.54$ |
| Paenibacillus pasadenensis | $1.2^b \pm 0.15$ | $13.32^d \pm 0.65$ |
| Geobacillus zalihae | $1.1^b \pm 0.67$ | $13.41^d \pm 0.34$ |
| Brevibacillus para brevis | $1.2^b \pm 0.33$ | $9.65^b \pm 0.54$ |
| Burkholderia cepacia | $1.4^c \pm 0.65$ | $6.23^a \pm 0.12$ |
| Bacillus spp. | $1.6^d \pm 0.21$ | $13.58^d \pm 0.54$ |
| Cytobacillus firmus | $1.7^e \pm 0.21$ | $16.53^{ef} \pm 0.24$ |
| Paenibacillus spp. | $1.5^{cd} \pm 0.24$ | $11.23c \pm 0.55$ |
| Pseudomonas spp. | $2.8^g \pm 0.21$ | $21.64^g \pm 0.35$ |
| Paenibacillus herberti | $1.6^d \pm 0.01$ | $11.14^c \pm 0.24$ |
| Geobacillus thermocatenulatus | $2.5^{ef} \pm 0.32$ | $21.14^g \pm 0.25$ |
| Pseudomonas spp. | $1.4^c \pm 0.21$ | $17.54^f \pm 0.56$ |
| Bacillus spp. | $1.6^d \pm 0.34$ | $11.43^c \pm 0.32$ |

500 swiftlet bird houses in Binh Thuan province, Bac Lieu City, and other areas near Ho Chi Minh City in Vietnam were tested with the beneficial microorganism described above. These swiftlet bird houses were either brand new or existing swiftlet bird houses. The test results showed a 100% improvement in these swiftlet bird houses. In the new bird houses, swiftlets were attracted and came in to nest in less than two hours. In the old bird houses, the odors were eliminated. Later on, the bird nests showed a brighter color than the old ones. Other results were also observed and listed below:
   (a) Ammonia in the swiftlets' feces was oxidized and transformed to non-toxic organic nitrogen ($N_2$);
   (b) Hydrogen sulfide ($H_2S$) was eliminated;
   (c) Acrimonious odors from the swiftlets' guano were substantially reduced, improving the air quality essential to the nesting and the high-quality of the edible bird's nests (EBN);

(d) The swiftlets paired up and nested more than usual; and (e) The bird's nests harvested had a healthy opaque color.

DESCRIPTION OF NUMERALS

400 Swiftlet bird house
401 Ground floor
402 First Floor
403 Second floor
404 Roof
405 Footing and Foundation
406 Ground floor removable rug for containing guano
407 First floor removable rug
408 Second floor (top floor) removable rug
409 Exit/entrance window
411 Computer and speaker box
412 Speakers
421 Sensors

What is claimed is:

1. A microorganism-based method for improving living conditions for swiftlet bird houses, comprising:
   (a) collecting samples from said swiftlet bird houses;
   (b) identifying harmful microorganisms that cause harm to swiftlet birds from said samples using a 16S rRNA sequencing method, wherein said samples further comprise harmful chemicals comprising hydrogen sulfide ($H_2S$), nitrite ($NO_2^-$), ammonia ($NH_3$), and nitrate ($NO_3^-$);
   (c) identifying beneficial microorganisms capable of eliminating said harmful microorganisms and said harmful chemicals for said swiftlet bird houses by isolating and bioactivity testing of said beneficial microorganisms, wherein said beneficial microorganisms comprise *Bacillus* spp., *Paenibacillus* spp., and *Lactobacillus* spp.;
   (d) synthesizing said beneficial microorganisms for said swiftlet bird houses by mixing together said beneficial microorganisms;
   (e) encapsulating said beneficial microorganisms for said swiftlet bird houses with a slow-releasing carrier to obtain a microbial composition; and
   (f) applying said microbial composition to said swiftlet bird houses.

2. The microorganism-based method of claim 1 wherein in said step (e), said encapsulating further comprises stirring said beneficial microorganisms with said slow-releasing carrier for three hours to obtain a first mixture comprised of beneficial microorganisms and slow-releasing carrier.

3. The microorganism-based method of claim 2 wherein said step (e) further comprises vacuum drying at a temperature of less than 40° C. and blending said first mixture at 12,000 rpm to obtain a second mixture of said beneficial microorganisms and said slow-releasing carrier.

4. The microorganism-based method of claim 3 further comprising a step of mixing one kilogram of said second mixture with 100 liters of water to obtain said microbial composition.

5. The microorganism-based method of claim 4 wherein in said *Bacillus* spp. in said step (d) further comprises: *Bacillus stratosphericus, Bacillus aryabhattai, Bacillus subtilis, Bacillus mesentericus, Bacillus pumilus, Bacillus xiamenensis, Bacillus megaterium, Bacillus altitudinis, Bacillus velezensis, Bacillus amyloliquefaciens, Bacillus coagulans, Bacillus thuringiensis*, and *Bacillus firmus* whose count for each species in CFU/kg is $10^{10}$-$10^{13}$.

6. The microorganism-based method of claim 5 wherein said *Lactobacillus* spp. in said step (d) further comprises: *Lactobacillus acidophilus, Lactobacillus plantarum, Lactobacillus casei, Lactobacillus fermentum, Lactobacillus rhamnosus, Lactobacillus reuteri, Lactobacillus paracasei, Lactobacillus helveticus* and *Lactobacillus grasseri* whose count for each species in CFU/kg is $10^{10}$-$10^{13}$.

7. The microorganism-based method of claim 6 wherein said *Paenibacillus* spp. in said step (d) further comprises: *Paenibacillus glycanilyticus, Paenibacillus pectinilyticus, Paenibacillus polymyxa, Paenibacillus xylanexedens, Paenibacillus amylolyticus, Paenibacillus glucanolyticus, Paenibacillus aceti, Paenibacillus antibioticophila, Paenibacillus cellulosilyticus, Paenibacillus humicus*, and *Paenibacillus xanthanilyticus* whose count for each species in CFU/kg is $10^{10}$-$10^{13}$.

8. The microorganism-based method of claim 7 wherein said beneficial microorganisms in said step (d) further comprise: *Rhodococcus* spp., *Rhodobacter* spp., *Nitrosomonas* spp., *Nitrobacter* spp., *Paracoccus* spp.; and
   *Paracoccus denitrificans, Pichia anomala, Saccharomyces cerevisiae, Rhodotorula glutinis, Pediococcus acidilactici, Streptococcus thermophilus*, and *Fictibacillus phosphorivorans* whose count for each species in CFU/kg is $10^{10}$-$10^{13}$.

9. The microorganism-based method of claim 8 wherein said slow-releasing carrier is selected from a group consisting of nanozeolites, zeolites, cassava starch, and maize starch.

10. The microorganism-based method of claim 2 wherein after said step (d) and before said step (e) the following steps are performed:
    multiplying said beneficial microorganisms, and
    separating said multiplied beneficial microorganisms using a Flotweg decanter centrifuging machine with a 0.2 μm filter screen.

* * * * *